United States Patent [19]

Cohen

[11] Patent Number: 5,120,120
[45] Date of Patent: Jun. 9, 1992

[54] MULTIFOCAL OPTICAL DEVICE WITH SPURIOUS ORDER SUPPRESSION AND METHOD FOR MANUFACTURE OF SAME

[76] Inventor: Allen L. Cohen, 10010 Walsham Ct., Richmond, Va. 23233

[21] Appl. No.: 558,442

[22] Filed: Jul. 27, 1990

[51] Int. Cl.⁵ .................. G02C 7/04; G02B 27/44; A61F 2/16
[52] U.S. Cl. .................. 351/161; 264/1.8; 351/177; 359/565; 359/571; 359/574; 359/575; 623/6
[58] Field of Search .............. 351/160 R, 160 H, 161, 351/162, 168, 177; 350/162.16, 162.20, 122.22; 623/6; 264/1.8; 359/565, 571, 574, 575

[56] References Cited

FOREIGN PATENT DOCUMENTS 80039 9/1986 Israel .

OTHER PUBLICATIONS

Genovesa et al., "Phase Plate Lens for a Multiple Image Lens System"; IBM Tech Disclosure Bulletin; vol. 8; No. 12; May 1966, pp. 1796, 1797.

H. Kyuragi et al., "High-Order Suppressed Phase Zone Plates", Applied Optics, vol. 24, No. 8, Apr. 1985.

P. R. King, "The Design of Diffractive Surface Relief Lenses with More Than One Focus", Acta Polytech. Scand, Proc. of Image Sci., 1985.

Primary Examiner—Scott J. Sugerman

[57] ABSTRACT

A multifocal optical device is provided for focusing light traveling parallel to an optical axis of the device. The multifocal optical device comprises a multifocal phase zone plate including at least two annular zones disposed substantially concentrically about the optical axis and spaced in a radial dimension from the optical axis in proportion to the square root of q, where q is an integer zone number; and an absorbing material disposed on a portion of ones of the annular zones for absorbing a portion of the light.

16 Claims, 22 Drawing Sheets

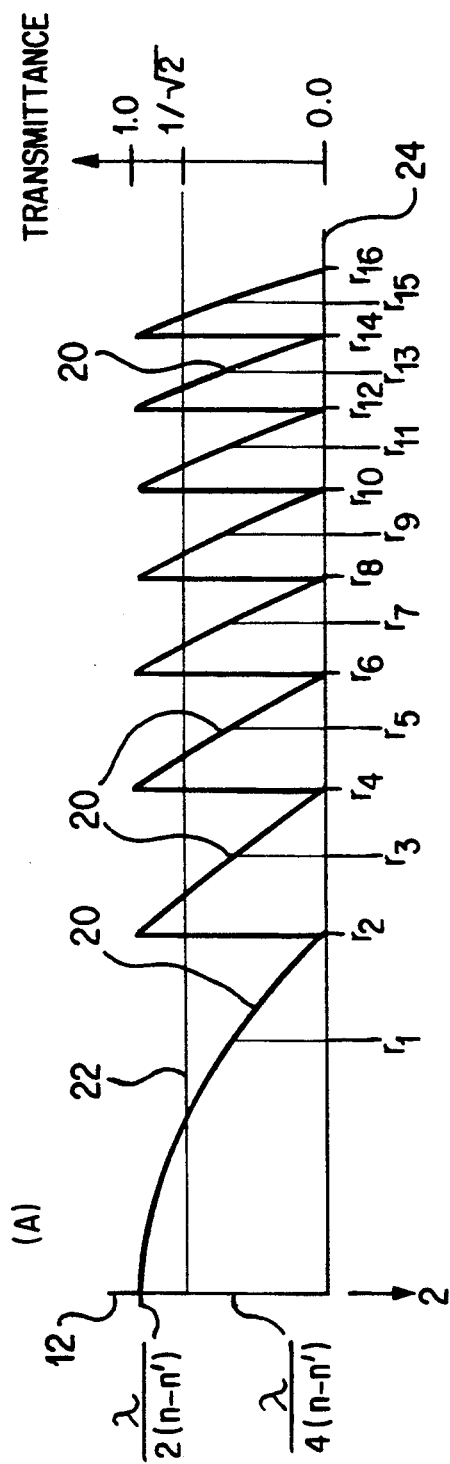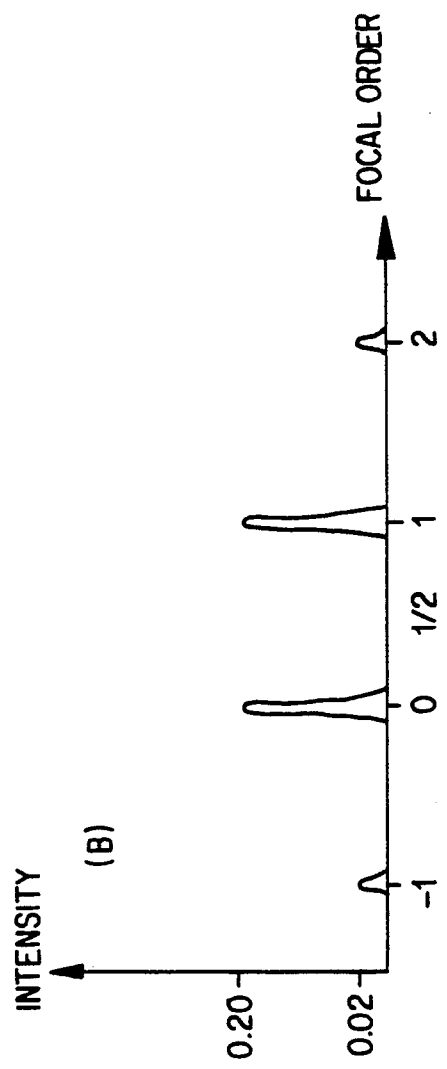
FIG. 5A
FIG. 5B

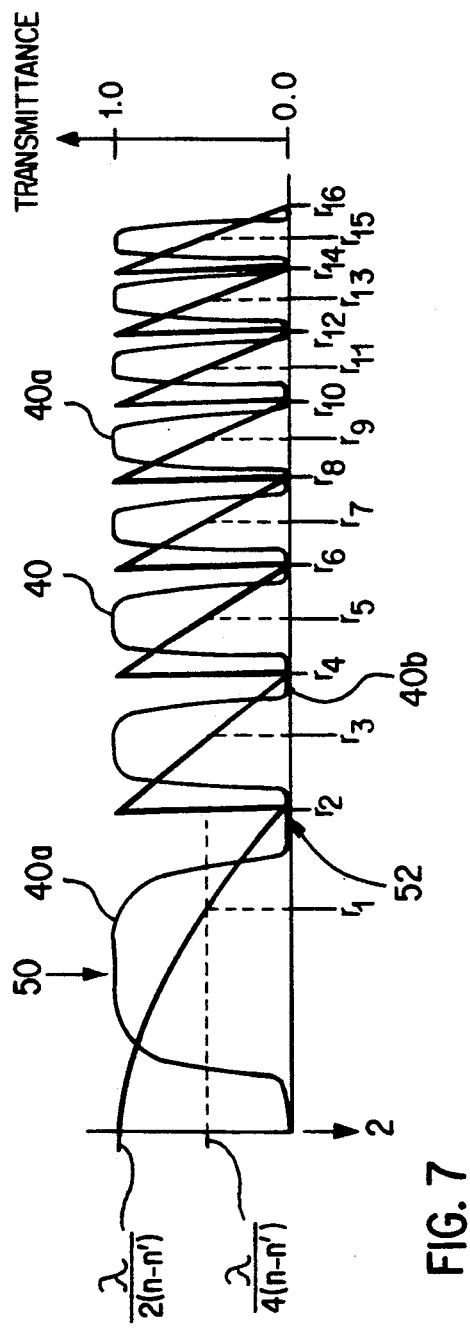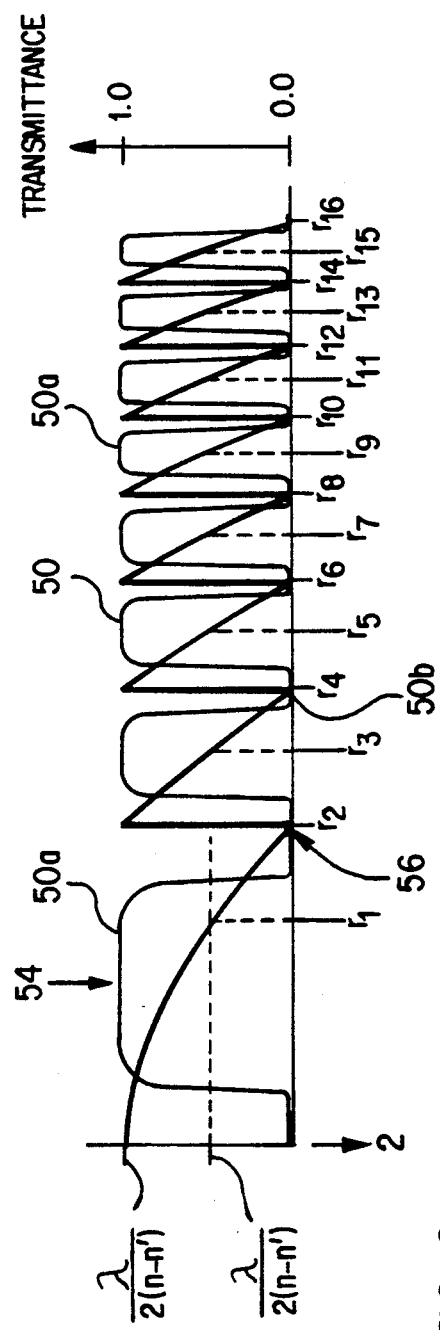

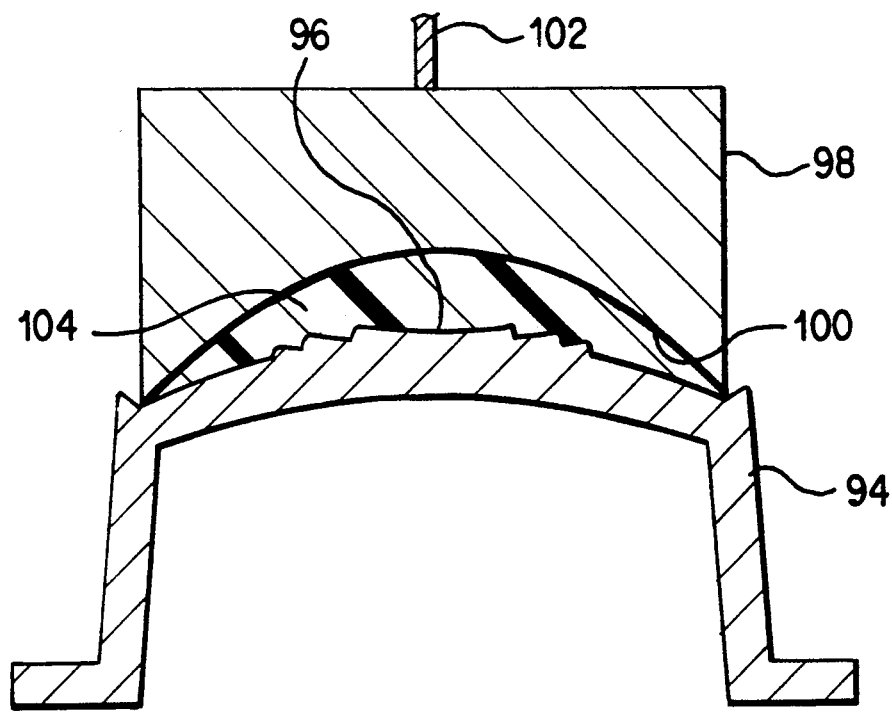
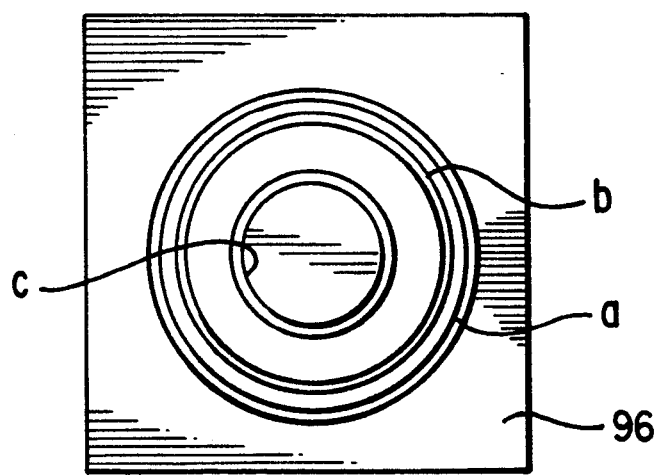
FIG. 22

MULTIFOCAL OPTICAL DEVICE WITH SPURIOUS ORDER SUPPRESSION AND METHOD FOR MANUFACTURE OF SAME

BACKGROUND OF THE INVENTION

1. Field of the Invention

The present invention relates to multifocal optical devices such as multifocal ophthalmic devices, and methods for making such devices.

2. Description of the Related Art

A "phase zone plate" as the term is used in this document is an optical device utilizing a combination of a zone plate and one or more echelettes or steps in the zones. A phase zone plate typically includes concentric annular zones wherein the radii "$r_q$" of the concentric annular zones are spaced substantially proportional to the square root of q, where q is an integer zone number. Specifically, the annular zones in a zone plate are spaced according to the following relationship:

$$r_q = \sqrt{q\lambda f}$$

where:
$\lambda$ = the wavelength of light;
f = focal length of the positive or negative $1^{st}$ order of diffraction; and
q = zone number, an integer.

Although the foregoing relationship establishes the focal length of a phase zone plate, by altering the step height of the echelettes within the zones, their refractive index, their surface profile, or any combination thereof, the relative distribution of light to the various orders of diffraction can be changed. "Phase profile" as used in this document refers to the optical phase shift profile resulting from the geometric surface profile of the phase zone plate surface and its refractive index through which light propagates as it enters or leaves the optical device.

The design of phase zone plates can be such that about 80 percent of the light incident on the phase zone plate, i.e., perpendicularly into the drawing sheet of FIG. 1, can be split and directed to the $0^{th}$ and $1^{st}$ orders, with about 40.5 percent being transmitted to each of those orders. The remainder of the light is transmitted to other spurious orders. For example, there is described in commonly owned copending application Ser. No. 456,226 (a continuation application of Ser. No. 280,899, now abandoned filed Dec. 7, 1988, which is a continuation-in-part of commonly owned application Ser. No. 863,069 filed May 14, 1986), now U.S. Pat. No. 5,017,000 a phase zone plate utilizing a geometric surface profile corresponding to a parabolic function, hereinafter called the parabolic surface profile. The parabolic surface profile is a repetitive profile with its basic pattern defined across the first two annular zones (bounded between r=0 and r=$r_2$) as:

$$d = D_0(1 - r^2/b^2)$$

where:
d = depth of the echelettes;
$D_0$ = maximum depth of the echelettes;
r = radial distance within the first two zones of the phase zone plate measured perpendicularly from the optical axis; and
b = outside radius ($r_2$) of the second annular zone.

The echelette or facet depth within the phase zone plate for an equal energy split between the $0^{th}$ and $1^{st}$ orders is given by:

$$D_0 = 0.50 \lambda/(n - n')$$

where:
$\lambda$ = design wavelength;
n = index of refraction of the lens material; and
n' = index of refraction of the adjacent medium The associated phase profile is:

$$\phi = \pi(1 - r^2/b^2)$$

and the intensity of light focused to the $0^{th}$ and $1^{st}$ orders is given by:

$$I_0 = I_1 = \text{sinc}^2(0.50)$$

where:
$\text{sinc}(x) = \sin(\pi x)/(\pi x)$.

In S.A. Klein and Zhuo-Yan Ho, "Multifocal Bifocal Contact Lens Design," *Proc. SPIE*, Vol. 679, pp. 25-35, Aug. 1986, Table 2 and corresponding comments, it is confirmed that an optimum split of the transmitted light to two focal points, particularly at the $0^{th}$ and the $1^{st}$ orders, occurs for a phase zone plate having a parabolic surface profile in which the blazing has a maximum depth corresponding to one half of the design wavelength. According to Klein and Ho, the following intensities at the orders (m) are achieved for such a bifocal lens:

| m | Intensity |
|---|---|
| −4 | .0050 |
| −3 | .0083 |
| −2 | .0162 |
| −1 | .0450 |
| 0 | .4053 |
| 1 | .4053 |
| 2 | .0450 |
| 3 | .0162 |
| 4 | .0083 |

Another example of altering the distribution of light intensities among various orders in a phase zone plate is provided in commonly-owned copending application Ser. No. 456,230 now U.S. Pat. No. 4,995,715 (a continuation application of Ser. No. 222,000, filed Jul. 20, 1988) now abandoned. The '230 application describes a phase zone plate having a surface profile corresponding to a cosine function, hereinafter called the cosine surface profile. The cosine surface profile is defined in terms of the following relationship:

$$d = D_0\{\tfrac{1}{2} + \tfrac{1}{2}\cos(\pi r^2/b^2)\}$$

where:
d = depth of the echelettes;
$D_0$ = maximum depth of the echelettes;
r = radial distance from optical axis; and
b = radius of first even zone ($r_2$).

The echelette or facet depth for an equal energy split between the $0^{th}$ and $1^{st}$ orders is given by:

$$D_0 = 0.405 \lambda/(n - n')$$

where:
$\lambda$ = design wavelength;

n = index of refraction of the device or lens material; and n' = index of refraction of the adjacent medium.

The associated phase profile is:

$$\phi = 0.405 \pi (1 + \cos(\pi r^2/b^2))$$

and the intensity of light focused to the $0^{th}$ and $1^{st}$ orders is given by:

$$I_0 = I_1 = J_0^2 (0.405 \pi) = 0.403.$$

where: $J_0$ = Bessel function.

Such a phase zone plate achieves an 81 percent transmission of the incident light to the $0^{th}$ and $1^{st}$ orders. The remaining 19 percent of the light is distributed among the spurious or subsidiary focal orders, also know as higher orders of diffraction.

It has now been determined that the distribution of incident light to the spurious or subsidiary focal orders significantly contributes to glare and haloing effects found in the use of ophthalmic lenses utilizing phase zone plates, especially those which maximize the transmission of light to the $0^{th}$ and $1^{st}$ orders. These effects have been found to cause discomfort to some wearers of ophthalmic lenses of such design, especially when the lenses are worn at night or in other low light conditions in the presence of a concentrated source of light, such as a distinctive light source surrounded by darkness or near darkness. Illustrative of such light sources are auto headlights and tail lights and street lamps. The causes of the glaring and haloing effects have been difficult to ascertain and only now are sufficiently understood that a solution to eliminate or ameliorate them is realizable.

OBJECTS OF THE INVENTION

Accordingly, an object of the present invention is to provide a multifocal optical device that reduces or eliminates the unwanted effects of glaring and haloing produced by known phase zone plates.

Another object of the invention is to provide a method for manufacturing such a multifocal optical device.

Additional objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purpose of the invention as embodied and broadly described herein, a multifocal optical device is provided for focusing light traveling parallel to an optical axis of the device. The multifocal optical device comprises a multifocal phase zone plate including at least two annular zones disposed substantially concentrically about the optical axis and spaced in a radial dimension from the optical axis in proportion to the square root of q, where q is an integer zone number; and absorbing means disposed on a portion of selected ones of the annular zones for absorbing a portion of the light.

The absorbing means may include at least one of a pigment, a paint, a dye, an ink composition, and a polymeric composition.

Preferably, the annular zones are positioned to direct the light to a $0^{th}$ order focal point, to a $1^{st}$ or 31 $1^{st}$ order focal point, and to higher order focal points on the optical axis, and predominately to the $0^{th}$ and $1^{st}$ or $-1^{st}$ order focal points, and the absorbing means is positioned to absorb portions of the light that would result in a greater amount of light being focused to the higher order focal points absent the absorbing means.

In some applications, it is preferable that the portion of each pair of adjacent annular zones upon which the absorbing means is disposed comprises less than all of the annular zone pair. In most applications, it is preferable that the absorbing means is disposed on the annular zones to absorb the light nonuniformly along the radial dimension and, further, that the absorbing means is disposed on the annular zones to absorb the light nonuniformly along the radial dimension for each of the annular zones. The absorbing means may be disposed on the annular zones to provide a sinusoidal transmission profile along the radial dimension. The absorbing means also may be disposed on the annular zones to form a binary transmission profile in which a first portion of selected pairs of adjacent annular zones has a first transmittance value and a second portion of the selected pairs of adjacent annular zones different from the first portion has a second transmittance value different from the first transmittance value. For example, the absorbing means may be disposed on the annular pairs in a repetitive profile satisfying the relationship:

$$A(p) = 1.0, \text{ for } R < p < S, \text{ with } 0.0 < R < S < 1.0,$$
and
$$A(p) = 0.0 \text{ for all other values of } p$$

where

A(p) is a transmission profile of the device as a function of p;

R is a first selected parameter;

S is a second selected parameter;

p is $r^2/b^2$;

r is a radial distance within a first and a second one of the zones of the multifocal phase zone plate measured perpendicularly from the optical axis; and b is an outside radius ($r_2$) of the second annular zone.

The invention also includes a method for manufacturing a multifocal optical device for focusing light traveling parallel to an optical axis of the device. The method comprises providing a multifocal phase zone plate including at least two annular zones disposed substantially concentrically about the optical axis and spaced from the optical axis in proportion to the square root of q, where q is an integer zone number; and disposing an absorbing material on a portion of each of the annular zones for absorbing a portion of the light.

The absorbing material disposing step may include providing a mold having mating first and second parts; affixing the absorbing material to the mold; filling the mold with a lens forming material; and mating the first and second mold parts to contact the absorbing material to the multifocal phase zone plate.

BRIEF DESCRIPTION OF THE DRAWINGS

The accompanying drawings, which are incorporated in and constitute a part of this specification, illustrate preferred embodiments and methods of the invention and, together with the description, serve to explain the principles of the invention.

FIG. 5A shows a cross-sectional view of the quarter section of the lens shown in FIG. 2A, including an absorbing material applied to provide a uniform transmission profile;

FIG. 5B shows a plot of intensity vs focal order for the lens of FIG. 5A;

FIGS. 7 and 8 show cross-sectional views of the quarter section of the lens shown in FIG. 2A in which an absorbing material is applied to provide various modifications of the binary transmission profile;

FIG. 22 shows two molding forms of FIG. 19 pressed together with lens forming material and absorbing material disposed between the molding forms;

DETAILED DESCRIPTION OF THE PREFERRED EMBODIMENTS AND METHODS

Figure 1:
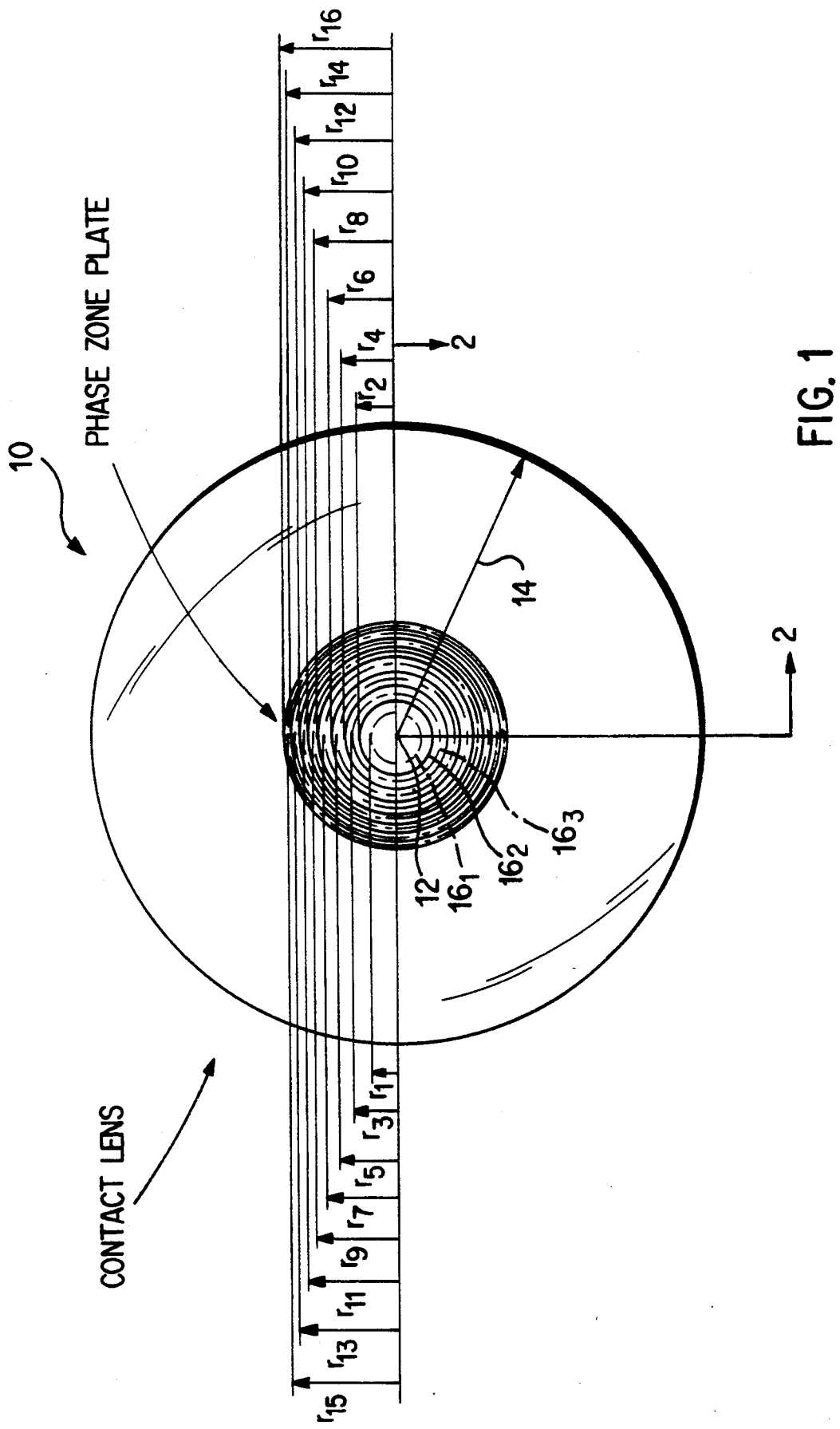
FIG. 1 is a front view of an ophthalmic lens having a phase zone plate with square root of q annular zone spacing.

The preferred embodiments and methods of the invention will now be described with reference to the drawings, in which like reference characters refer to like or corresponding parts throughout the drawings.

In accordance with the invention, a multifocal optical device is provided for focusing light traveling parallel to an optical axis of the device. The device of the invention comprises a multifocal phase zone plate including at least two annular zones disposed substantially concentrically about the optical axis and spaced in a radial dimension from the optical axis in proportion to the square root of q, where q is an integer zone number.

Figure 2A:
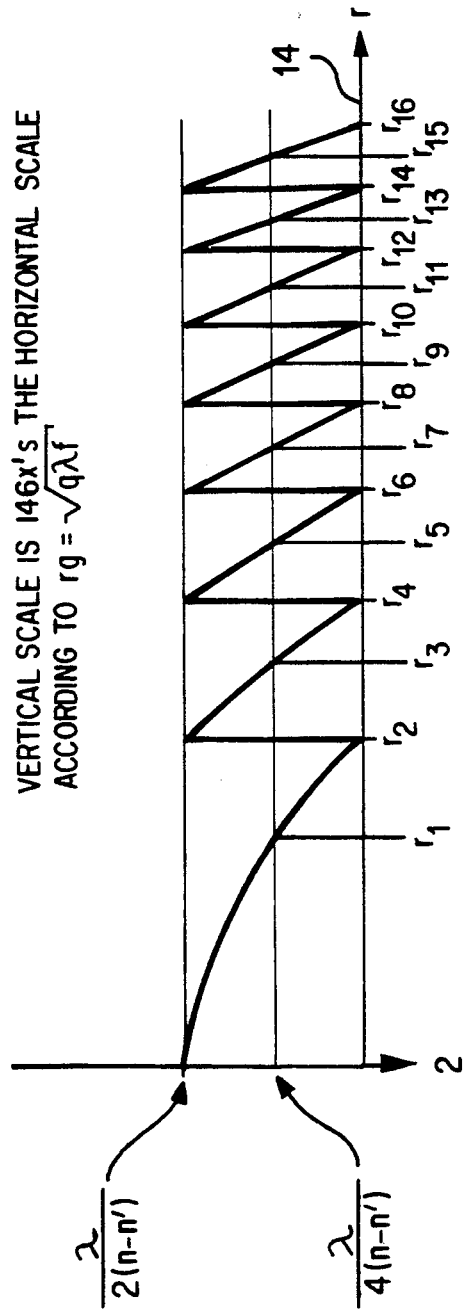
FIG. 2A is a cross-sectional view of a quarter section of the lens shown in FIG. 1 viewed along one of lines 2—2 of FIG. 1, wherein the echelettes of the lens have a parabolic surface profile.

A first preferred embodiment of the invention comprises a multifocal phase zone plate as shown in FIGS. 1 and 2A. FIG. 1 is a front view of an ophthalmic lens 10, such as a contact lens or an intraocular lens. Lens 10 has an optical axis 12 (a theoretical construct for reference purposes) that passes through the center of the lens perpendicularly to the plane of the drawing sheet. A radial dimension of the lens, indicated by arrow 14 in FIG. 1, is perpendicular to optical axis 12. The lens is designed to focus light traveling parallel to optical axis 12 (into the plane of the drawing sheet) to a plurality of focal or image points on axis 12, and preferably to two focal points. Lens 10 includes a center area 16 bounded on the outside by $r_1$, and a plurality of annular zones $16_2$, $16_3$, $16_4$, ..., each respectively bounded on the outside by $r_2$, $r_3$, $r_4$, ..., wherein the radii $r_q$ are disposed substantially concentrically about optical axis 12 and spaced from optical axis 12 in proportion to the square root of q, where q is a zone number. Each pair of the annular zones of lens 10 comprises a blazed echelette or facet 18 characteristic of a phase zone plate. Lens 10 includes 16 annular zones (8 echelettes) bounded by radii $r_1$ through $r_{16}$, although other numbers of zones may be used. The odd zones are bounded peripherally by $r_1$, $r_3$, $r_5$, $r_7$, $r_9$, $r_{11}$, $r_{13}$, and $r_{15}$, and the remaining zones are the even zones. In FIG. 1, the outer boundary of each odd zone is demarcated by dashed lines whereas the outer boundary of each even zone is demarcated by solid lines. The size of the phase zone plate and the echelettes in the phase zone plate is greatly exaggerated for ease of illustration. The portion of the lens through which the wearer sees, which includes the phase zone plate, is referred to as the optic zone.

The echelettes of lens 10 can have a number of different surface profiles. For example, the echelettes of the lens shown in FIG. 2A, which shows a cross-sectional view of a quarter section of lens 10 viewed along one of lines 2—2 of FIG. 1, have a parabolic surface profile. In this lens, the maximum difference in optical path length for a given echelette, corresponding to the maximum echelette step height, is substantially equal to one-half of the design wavelength. The lens therefore provides a plurality of focal points, focal orders, or orders of diffraction.

Figure 2B:
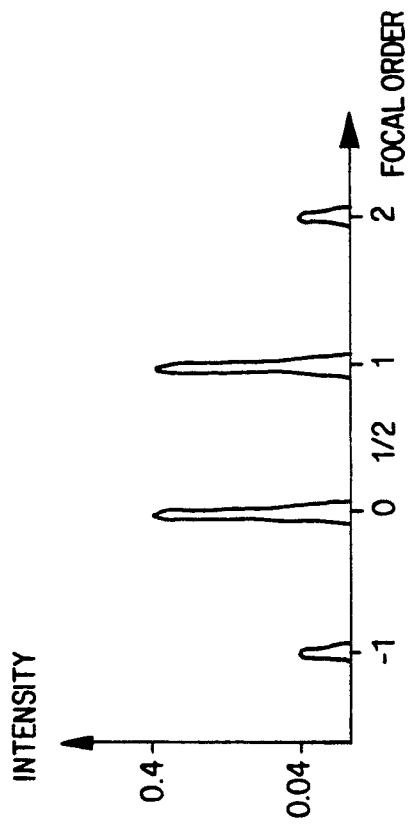
FIG. 2B shows a plot of intensity vs focal order for the lens of FIG. 2A.

The annular zones preferably are profiled to direct the light to a $0^{th}$ order focal point, to a $1^{st}$ or $-1^{st}$ order focal point, and to higher order focal points on the optical axis, and predominantly to the $0^{th}$ and 1st or $-1^{st}$ order focal points. For example, FIG. 2B, which is a graph of intensity vs. focal order for the lens of FIG. 2A, shows the two primary focal points at orders 0 and 1, and two of the subsidiary, spurious, or higher order focal points, in this case, orders $-1$ and 2. In this lens, each of the primary focal points (the $0^{th}$ and the $1^{st}$ orders) receive 40.5 percent of the transmitted light. The subsidiary or spurious focal points, e.g., the $-1^{st}$, $2^{nd}$, $-3^{rd}$, $-4^{th}$, $2^{nd}$, $3^{rd}$, $4^{th}$ and higher order focal points, collectively receive 19 percent of the transmitted light. See, e.g., the Klein and Ho article noted above. As shown in FIG. 2B, the $-1^{st}$ and $2^{nd}$ focal points each receive about 4 percent of the incident light.

Figure 3:
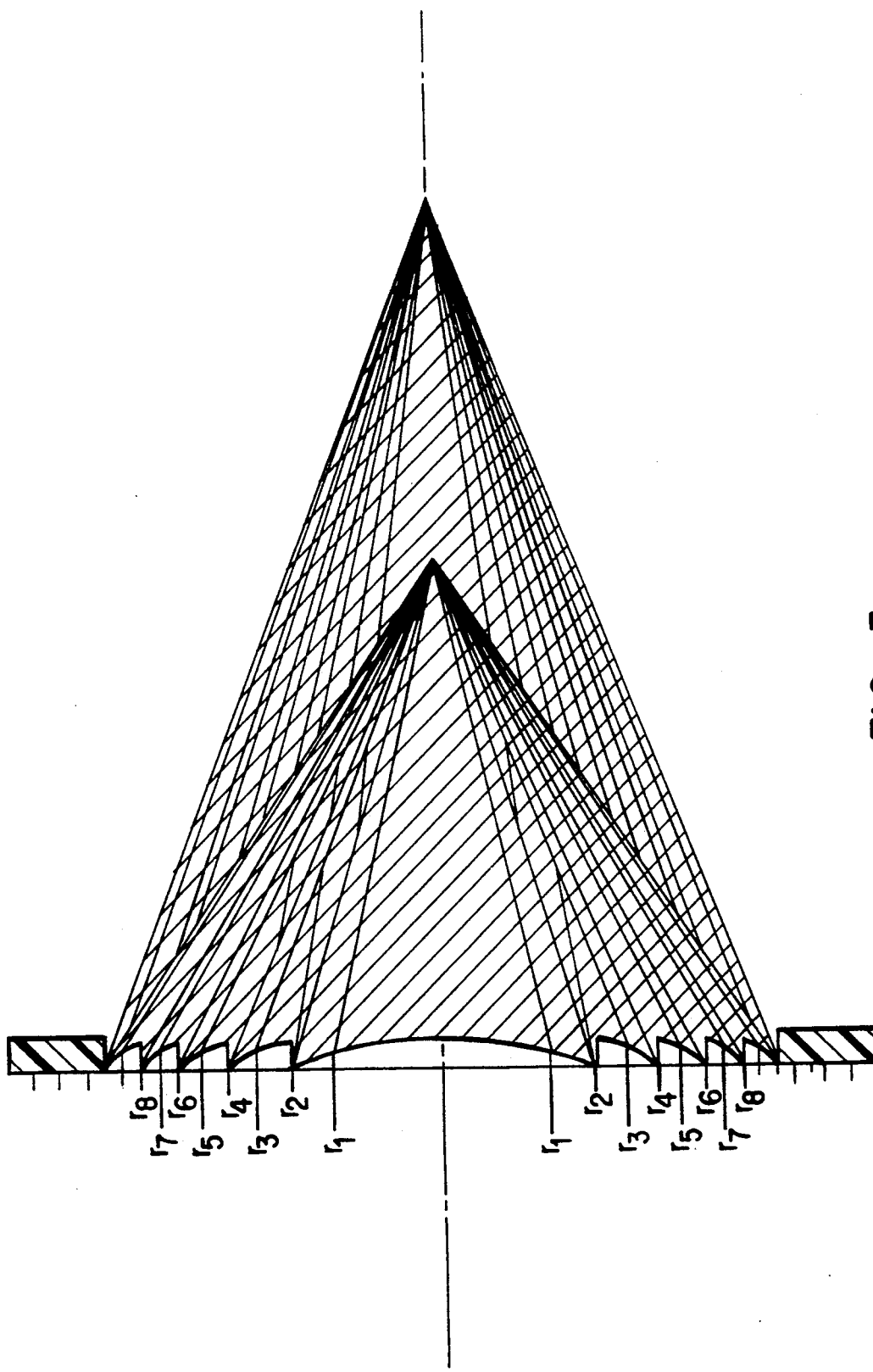
FIG. 3 is a cross-sectional view of a full phase zone plate constructed according to the profile of FIG. 2A.

FIG. 3 shows a cross-sectional view of a full phase zone plate constructed according to the parabolic surface profile of FIG. 2A. This figure shows the wave effects derived from the diffraction characteristics of the phase zone plate, and the capability of a phase zone plate to produce images at two foci. The light waves transmitted by the phase zone plate are focused by the phase zone plate to two primary focal points, the near $1^{st}$ order focal point and the far $0^{th}$ order focal point.

The invention further includes absorbing means disposed on a portion of selected ones of the annular zones for absorbing a portion of the light incident on the face of the lens. The absorbing means is preferably positioned to preferentially reduce the light that would be focused to the higher order focal points absent the absorbing means, such as focal orders $-1$, $-2$, $-3$, $-4$, 2, 3, and 4. The absorbing means may include at least one of a pigment, a paint, a dye, an ink composition, and a polymeric composition, as explained in greater detail below. The light absorbing material may be an opaque, translucent or transparent material that has the capacity to absorb at least a portion of the light being transmitted through or to the lens. Generally, the absorbing material is a dye or pigmented thermoplastic or thermosetting material, preferably an organic polymeric material. If the lens is a hard lens, such as a lens made of polymethyl methacrylate, almost any organic polymeric material that will coat the lens surface or be co-moldable in the formation of the lens will be useful in a lens in accordance with the present invention. If the lens is a soft lens, then the organic polymeric material should be water resistant. In the preferred embodiments, all of the light absorbing materials are water resistant.

The geometry according to which the absorbing means is disposed upon the annular zones creates a pattern of varying transmissivity across the lens which is referred to in this document as the "transmission profile" of the lens. The transmission profile gives the amplitude of the incident light that is transmitted through the lens as a function of position on the lens.

The absorbing means can be provided in or on the lens in many different ways to create various transmission profiles, and can be any light absorbing material incorporated into or placed on the phase zone plate to preferentially reduce the light that would otherwise be focused to the spurious orders. The absorbing means absorbs light that, absent the absorbing means, would result in light being focused to the higher order focal points disproportionately more than it would be focused to the primary orders of diffraction, such that the primary orders still have a desirable level of focused light intensity. For example, the absorbing means may comprise an absorbing material placed symmetrically about the optical axis of the phase zone plate, and, preferably, adjacent to the phase zone plate, in a manner that light which would result in a disproportionately increased intensity focused to the spurious orders of diffraction is absorbed.

The absorbing means preferably is disposed on the annular zones to absorb incident light nonuniformly along the radial dimension and, more preferably, to absorb light according to a repetitive pattern along the radial dimension of the lens.

Figure 4A:
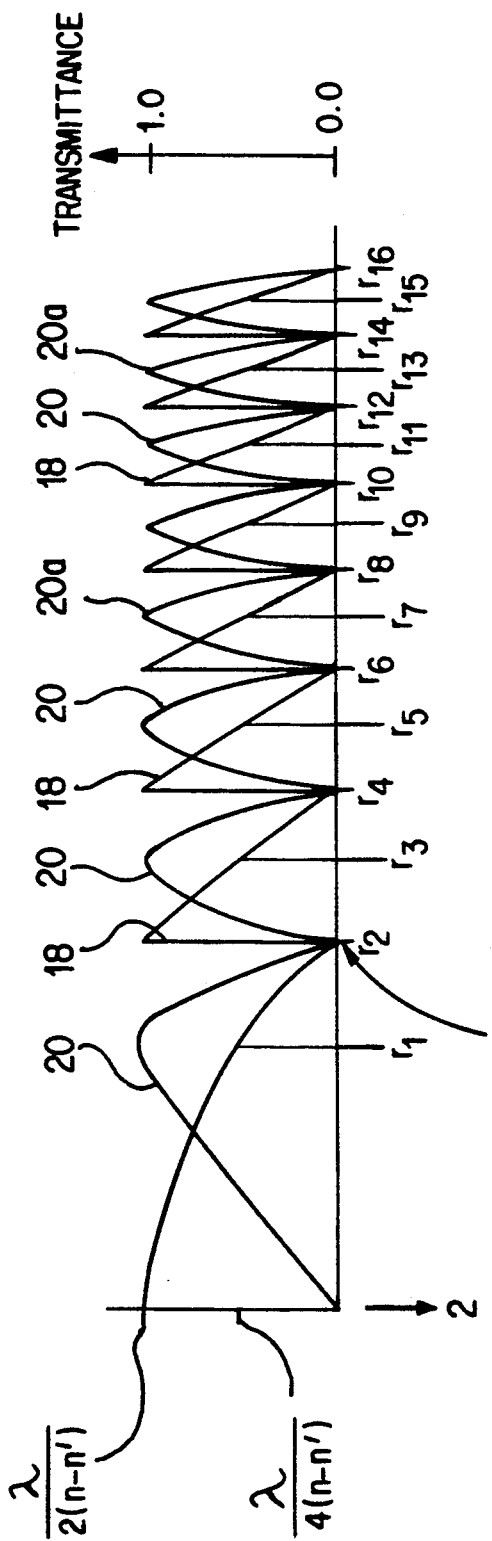
FIG. 4A shows a cross-sectional view of the quarter section of the lens shown in FIG. 2A in which an absorbing material is applied to provide a sinusoidal transmission profile in accordance with a first preferred embodiment of the invention.

In accordance with the first preferred embodiment, FIG. 4A shows a cross-sectional view of the quarter section of the phase zone plate shown in FIG. 2A that includes absorbing means according to the invention. The absorbing means for the lens of FIG. 4A comprises an absorbing material such as a tint or dye applied to the surface of the multifocal phase zone plate to provide a sinusoidal transmission profile. The sinusoidal transmission profile is a repetitive profile with its basic pattern defined across the first two annular zones (bounded between $r=0$ and $r=r_2$) as:

$$A(p) = \sin(\pi \cdot p)$$

where:
 $p = r^2/b^2$;
 r = the radial distance within the first two zones of the multifocal phase plate measured perpendicularly from the optical axis; and b = outside radius ($r_2$) of the second annular zone.

Curve 20 of FIG. 4A shows the sinusoidal transmission profile for the lens. The transmission profile comprises a repetitive sequence of half sine waves, each half sine wave corresponding to two adjacent annular zones (one echelette), and the half sine waves having a period that decreases radially outward from the optical axis corresponding to the decreasing spacing of the annular zones.

Transmission profile 20 shown in FIG. 4A relies on gradations of light absorption across each echelette. Apexes 20a, which constitute the extreme case of zero absorption, correspond to the annuli at the $r_q$ positions, q being an odd integer. The nadirs 20b of profile 20 correspond to total light absorption.

With the lens of FIG. 4A, the intensity of light that would otherwise be focused to higher orders of diffraction is completely eliminated. Stated another way, an absorbing material applied to a lens, such as shown in FIG. 4A, will accomplish a preferential absorption of light that will attenuate light focused to higher order focal points relative to light focused to the primary focal points.

An understanding of the invention is facilitated by analyzing the intensity of the light focused by the lenses discussed in this document as a function of position along the optical axis. The standard intensity equation is used to calculate the light intensity $I_m$ focused by the lens at the $m^{th}$ order focal point:

$$I_m = T_m \cdot T_m^*$$

where:

$$T_m = \int_0^1 A(p) \exp\{i \cdot \phi(p)\} \cdot \exp\{2\pi \cdot i \cdot m \cdot p\} \, dp$$

$I_m$ = intensity of light on the optical axis at diffractive order m;

$T_m$ = complex amplitude of light focused at the $m^{th}$ order;

$T_m^*$ = complex conjugate of $T_m$;

A(p) = transmission profile;

i = complex operator;

$\phi(p)$ = phase shift profile;

p = $r^2/(r_2)^2$, where r is the radial distance along the radial dimension from the optical axis and $r_2$ is the radius of the first even zone; and m = diffractive order.

A limitation of the type of diffractive bifocal lens shown in FIG. 2A, which does not include an absorbing means, is presented by the 19 percent of the incident light focused at the spurious diffractive orders. This stray light does not contribute to formation of the desired image to be perceived by the viewer. FIG. 2B shows two of the spurious orders.

Figure 2C:
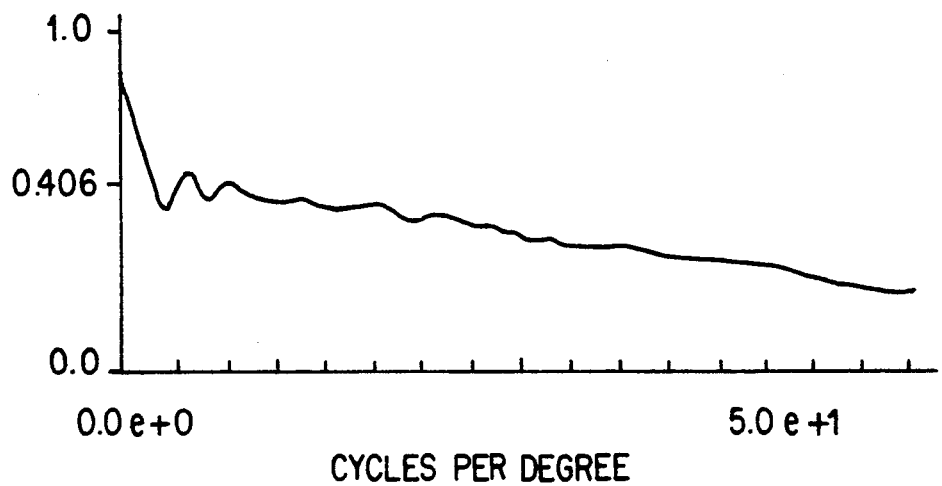
FIG. 2C shows a graph of the modulation transfer function for the lens of FIG. 2A.
Figure 2D:
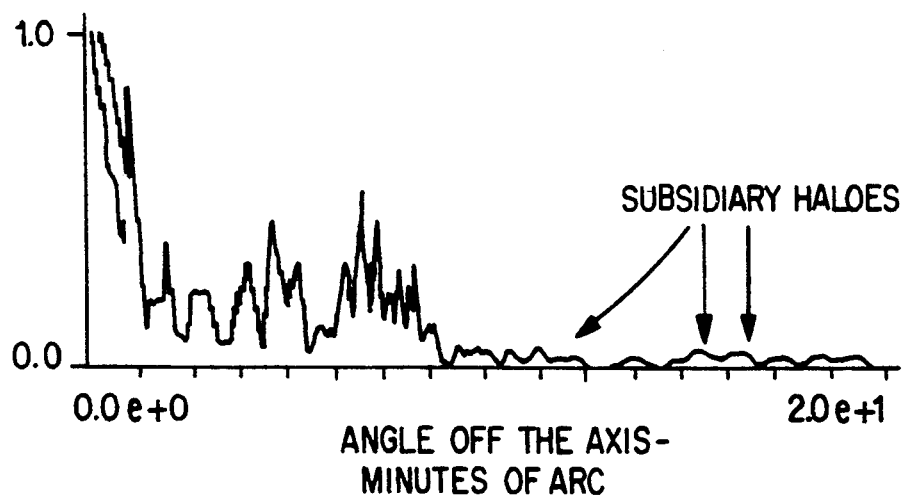
FIG. 2D shows a plot of the point spread function for the lens of FIG. 2A.

FIG. 2C is a plot of the modulation transfer function for the lens of FIG. 2A, which plots the ratio of image contrast to object contrast as a function of cycles per degree. Modulation transfer functions are described, for example, in J.W. Goodman, *Introduction to Fourier Optics*, McGraw-Hill Book Co., 1968. FIG. 2C shows that only 40.5 percent of the light transmitted by the lens is focused at each of the primary focal points. FIG. 2D is a plot of the point spread function for the lens of FIG. 2A, which plots image intensity as a function of minutes of arc from the optical axis. Point spread functions are also described in the Goodman text. FIG. 2D shows that the lens of FIG. 2A creates many small haloes surrounding the main shadow, which is a blurred circle as seen by the viewer resulting from the out of focus image. The undesirable haloing and glare effects can be significantly reduced by preferentially absorbing that portion of the incident light which would otherwise result in a greater intensity of light being focused by diffraction to the higher order focal points. The absorbing means of the invention serves this function.

The preferred embodiment of FIG. 4A provides advantages over the simple expedient of having an absorbing material applied to provide a uniform transmission profile with $A = 1/\sqrt{2}$. To illustrate, FIG. 5A shows a cross-sectional view of the quarter section of the lens shown in FIG. 2A that further includes an absorbing material applied to provide a uniform transmission profile. The parabolic surface profile of the lens material as described above with reference to FIG. 2A is designated in FIG. 5A by solid line 20 while the uniform transmission profile is shown by a dotted line 22. The transmittance of the lens is determined by the absorbing material, and the constant transmittance value $A = 1/\sqrt{2}$ is indicated by the height of profile line 22 above a base line 24 of the lens. The absorbing material is disposed on the lens of FIG. 5A so that, although the phase shifting profile of the lens is identical to that of the bifocal lens of FIG. 2A, the lens, in addition, will uniformly absorb $(1 - A^2) = 0.5 = 50$ percent of the total incident light. The uniform transmission profile A(p) and the parabolic phase shift profile $\phi(p)$ for the lens of FIG. 5A are as follows:

$$A(p) = 1/\sqrt{2}$$

$$\phi(p) = \pi - \pi p$$

Solution of the intensity equation yields:

$$I_m = 0.5 \, \text{sinc}^2 (m - \tfrac{1}{2})$$

The total light transmitted by the lens of FIG. 5A is precisely one-half that for the lens of FIG. 2A. The intensities of the light to the $1^{st}$ and $0^{th}$ orders of diffraction remain equal to each other but are significantly lower than if there were no absorption, i.e., $I_0 = I_1 = 0.20$. As in the case of the phase zone plate of FIG. 2A with no absorbing means, the lens of FIG. 5A with a uniform transmission profile has subsidiary focal points in addition to the two main focal points at orders 0 and 1. FIG. 5B is a graph of intensity vs focal order for the lens of FIG. 5A. Thus, although the scheme of uniformly reducing the transmission of light across the whole phase zone plate reduces unwanted glare and halo effects, the fraction of the transmitted light that is focused at the $0^{th}$ and $1^{st}$ orders in relation to the higher orders remains unchanged for the lens of FIG. 5A, as compared to the phase zone plate of FIG. 2A.

A marked improvement is obtained by adding an absorbing material to the lens of FIG. 2A to effect to a sinusoidal transmission profile across each pair of adjacent annular zones as shown in FIG. 4A. The transmission profile A(p) and the phase shift profile $\phi(p)$ for the lens of FIG. 4A are as follows:

$$A(p) = \sin (\pi \cdot p)$$

$$\phi(p) = \pi - \pi p$$

Solution of the intensity equation for this lens gives:

$$I_m = 0.25 \text{ for } m = 0.1 \text{ (m equal to 0 or 1)}$$

$I_m = 0.00$ for m = 0.1 (m not equal to 0 or 1)

Figure 4B:
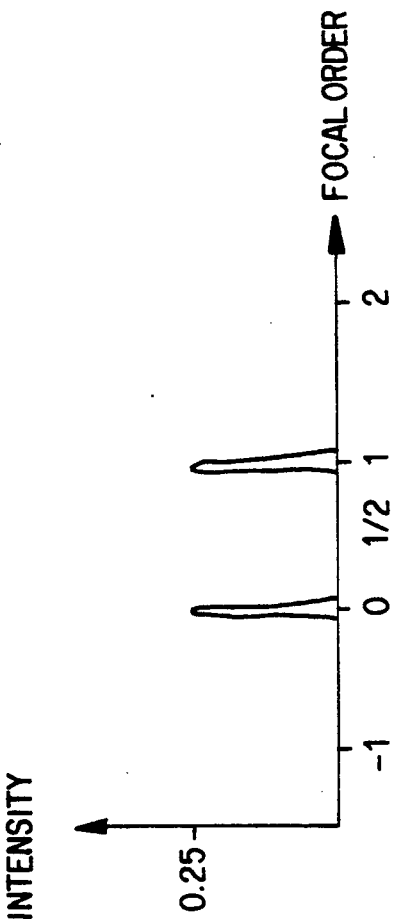
FIG. 4B shows a plot of intensity vs focal order for the lens of FIG. 4A.

Thus, the lens of FIG. 4A transmits more light to the primary $0^{th}$ and $1^{st}$ orders as compared to the lens of FIG. 5A, even though both lenses absorb precisely 50 percent of the total incident light. The intensities for this lens are $I_0 = I_1 = 0.25$. This occurs because the nonuniformly disposed absorbing material acts to transfer wasted light energy from the subsidiary focal powers into the two primary focal powers, the $0^{th}$ and $1^{st}$ orders. This lens has no subsidiary or spurious focal powers, as shown in FIG. 4B, which is a graph of the intensity vs focal position for the lens of FIG. 4A.

Figure 4C:
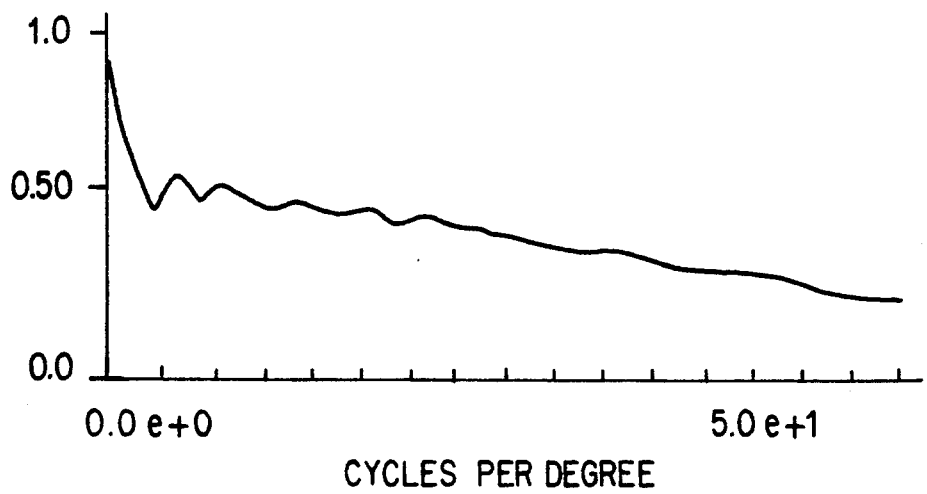
FIG. 4C shows a graph of the modulation transfer function for the lens of FIG. 4A.
Figure 4D:
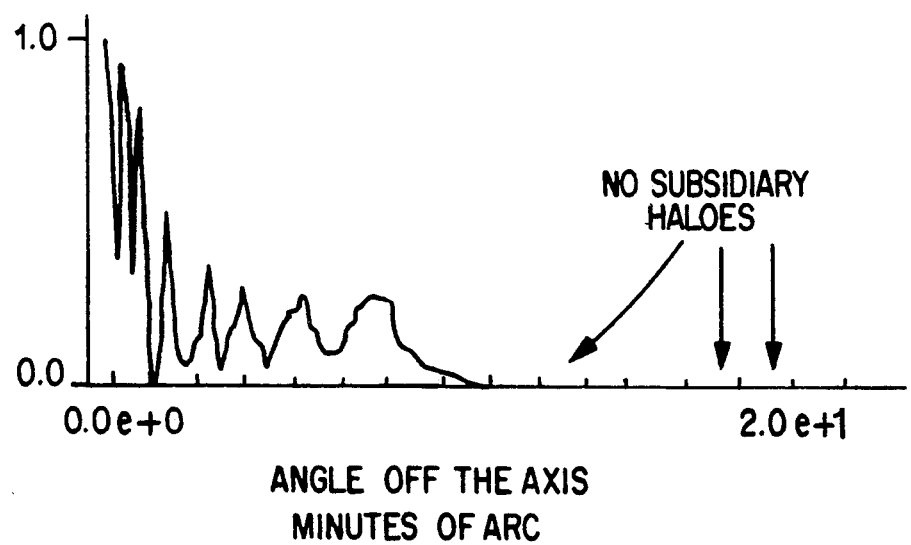
FIG. 4D shows a plot of the point spread function for the lens of FIG. 4A.

FIG. 4C, which is a plot of the modulation transfer function for the lens of FIG. 4A, demonstrates that 50 percent of the transmitted light is focused at the primary focal points. FIG. 4D, which is a plot of the point spread function of this lens, shows the absence of any halos surrounding the main shadow.

Notwithstanding its reduced total transmissivity, the lens of FIG. 4A has utility for use in ophthalmic lenses, such as contact or intraocular lenses, and other lenses for which it is desired that there be no transmission of light to spurious orders. One such application is in multifocal cameras in which the effects of reducing transmitted light can be compensated by the use of a faster film. Of course, if the benefits gained in respect to reduced haloing and glaring are to be realized under low light conditions, the reduction in light transmission will require a trade-off between film speed and picture quality.

Another application for a lens such as that of FIG. 4A is for use as a sunglass multifocal contact lens. For use in high sun conditions, a significant reduction in the total transmitted light may be considered an advantage. In this regard, the sinusoidal transmission profile discussed above with reference to FIG. 4A will be a most preferred embodiment. However, the light transmitted by this lens to the $0^{th}$ and $1^{st}$ orders is significantly reduced. Therefore, the lens may not be suited for use under all types of light conditions. For example, while the absorbing material of FIG. 4A eliminates all of the unwanted light, it also eliminates much of the light that would have been transmitted to the primary focal orders. In absolute terms, this embodiment will absorb 50 percent of the total incident light, 19 percent of which normally would be focused to unwanted focal powers and 31 percent of which normally would be focused to the primary focal powers.

A second preferred embodiment of the invention will now be described with reference to FIGS. 6A-6D. In this second preferred embodiment, the phase zone plate is designed with the parabolic surface profile as shown in FIG. 2A, and the absorbing material is disposed on the annular zones to create a repetitive binary transmission profile. In accordance with this embodiment, a first portion of selected pairs of adjacent annular zones has a first transmittance value and a second portion of the selected pairs of adjacent annular zones different from the first portion has a second transmittance value different from the first transmittance value. The binary transmission profile $A(p)$ and the parabolic phase shift profile $\phi(p)$ for each pair of annular zones of the lens of FIG. 6A are as follows:

$A(p) = 1.0$ for $R < p < S$, and $A(p) = 0.0$ for all other values of p $\phi(p) = \pi - \pi p$ where
$p = r^2/b^2$;
R is a first selected parameter with $0.0 < R < 1.0$; and
S is a second selected parameter with $R < S < 1.0$.

Figure 6A:
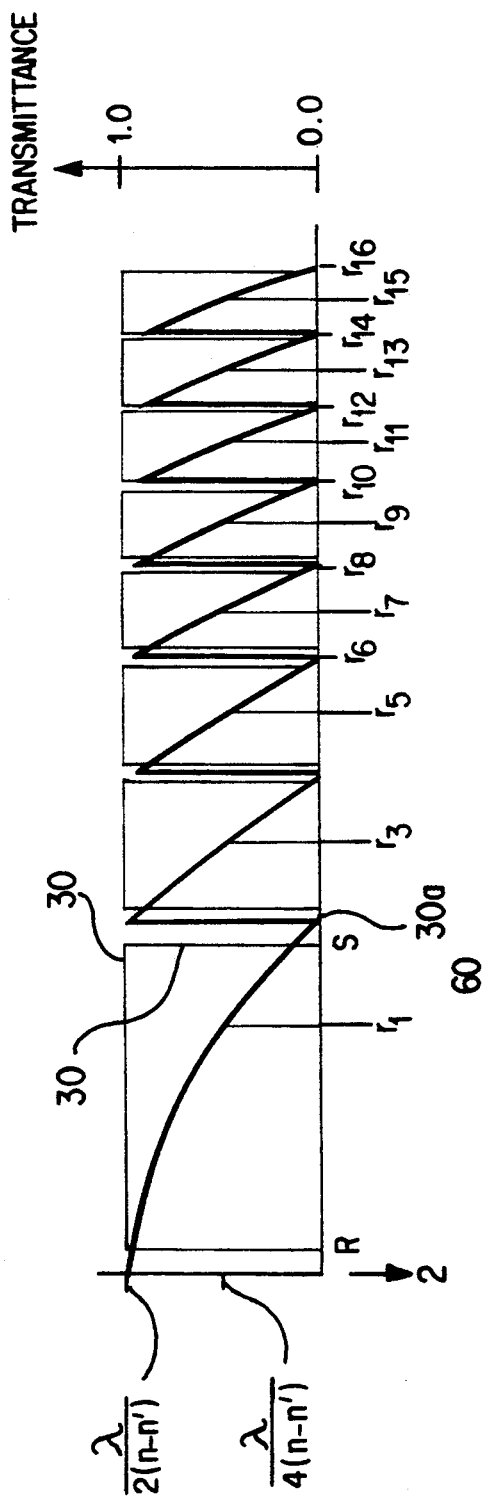
FIG. 6A shows a cross-sectional view of the quarter section of the lens shown in FIG. 2A in which an absorbing material is applied to provide a binary transmission profile in accordance with a second preferred embodiment of the invention.

As shown in FIG. 6A, the binary transmittance profile repeats itself for each pair of adjacent annular zones. Solving the intensity equation for this case provides the intensity function:

$$I_m = \sin^2[\pi(m-\tfrac{1}{2})(S-R)]/[\pi(m-\tfrac{1}{2})]^2$$

Preferably, the portion of each pair of adjacent annular zones upon which the absorbing means is disposed comprises less than all of the annular zone pair. This feature is described by the first and second parameters R and S.

Figure 6B:
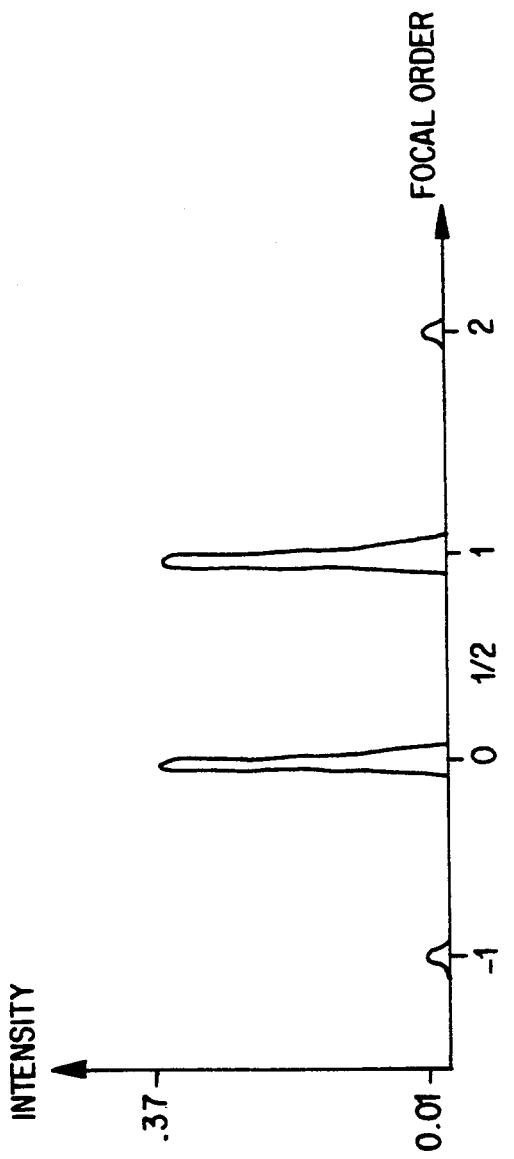
FIG. 6B shows a plot of intensity vs focal order for the lens of FIG. 6A.
Figure 6C:
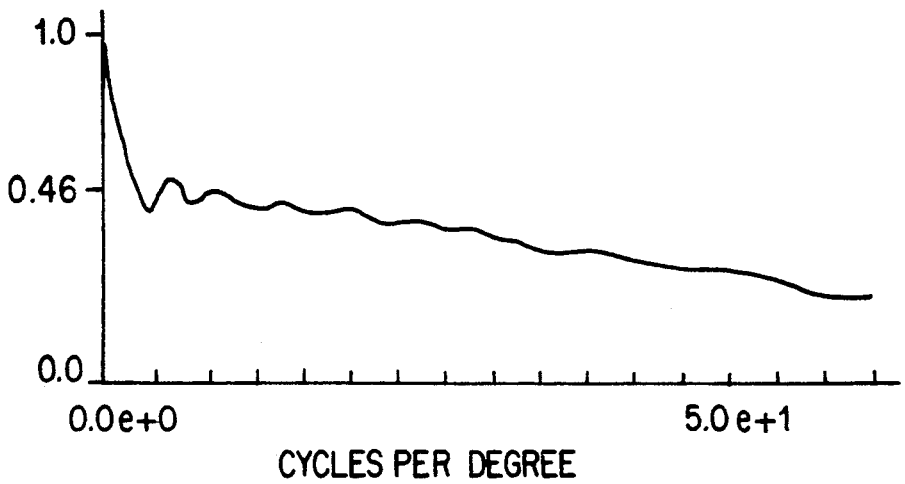
FIG. 6C shows a graph of the modulation transfer function for the lens of FIG. 6A.
Figure 6D:
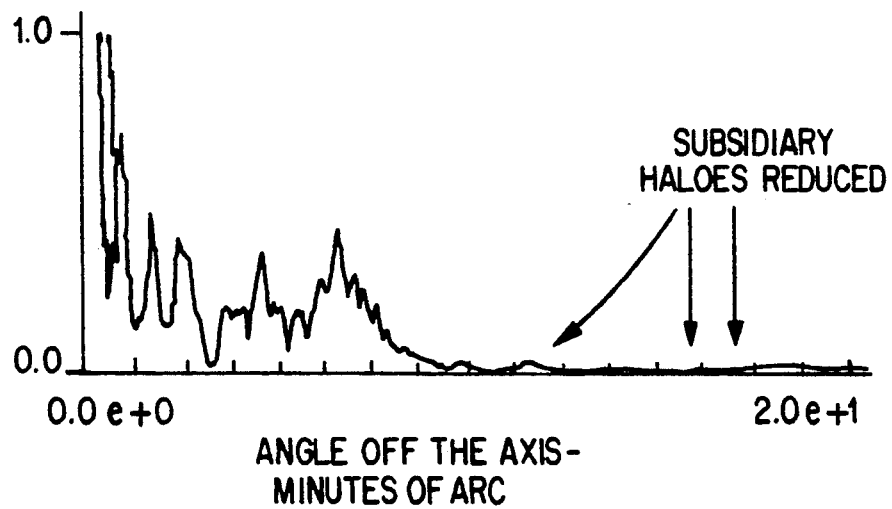
FIG. 6D shows a plot of the point spread function for the lens of FIG. 6A, and wherein the difference of the parameter values S-R =0.80.

FIG. 6A shows the binary transmission profile 30 of this embodiment, with sections 30a constituting areas of total absorption and sections 30b constituting areas of total transmission. FIGS. 6B-6D represent the special case of this lens in which $(S-R) = 0.80$. FIG. 6B is a graph of intensity vs focal order for this lens, and FIG. 6C is a plot of the modulation transfer function. FIG. 6C shows that 46 percent of the transmitted light (approximately 37 percent of the incident light) is focused at each of the primary focal points, as contrasted with 50 percent of the transmitted light (25 percent of the incident light) for the lens of FIG. 4A. FIG. 6D, which is a plot of the point spread function for this lens, shows the reduction of the usual haloes surrounding the main shadow.

FIGS. 7 and 8 show modified versions of the binary transmission profile illustrated in FIG. 6A. In FIG. 7, the high transmission portion 40a of the transmission profile 40 is broader than the high transmission portion 20a of FIG. 4A and the highly absorbent portion 40b extends across each zone for a distance greater than the absorbent portion 20b of the lens of FIG. 4A. In FIG. 8, the high transmission portion 50a of absorbency profile 50 is broader than that of FIG. 7, and the highly absorbent portion 50b is broader than the comparable absorbent portion of FIG. 7.

Figure 9A:
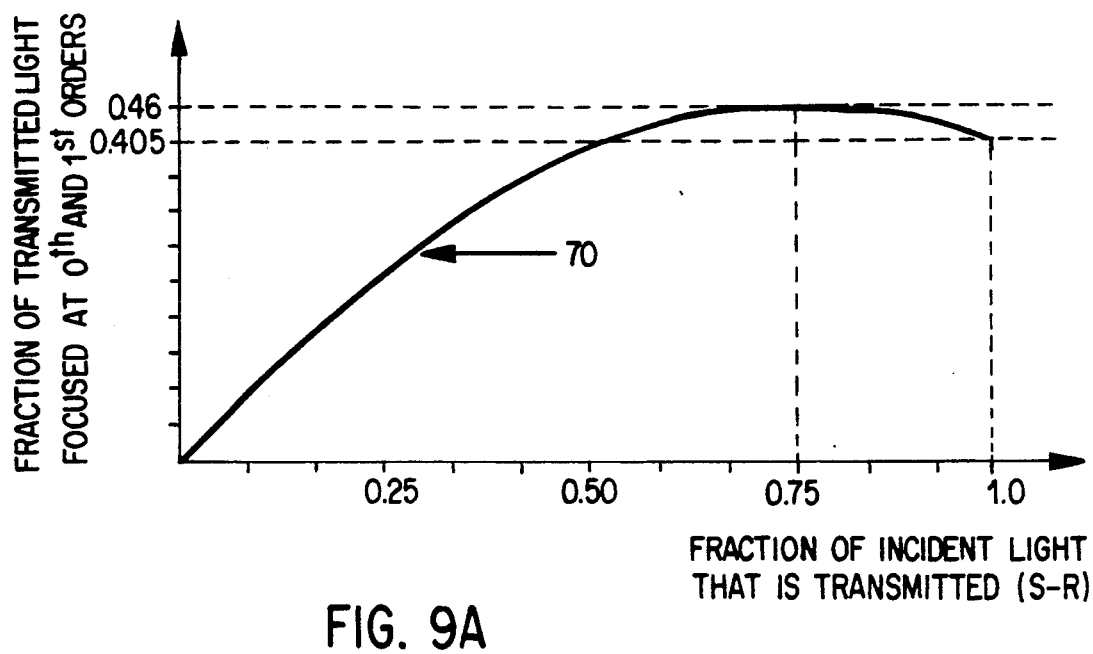
FIG. 9A shows a graph of the fraction of transmitted light focused to the primary focal points vs the fraction of incident light that is transmitted for the lens of FIG. 6A.

For the embodiment of FIG. 6A, the fraction of the incident light that is transmitted by the optical element is $(S-R)$, and the fraction of the transmitted light that is brought to focus at the $m^{th}$ focal order is given as $\{I_m/(S-R)\}$. S and R can be adjusted to simultaneously keep both the total transmitted light and the fraction of the transmitted light focused at the $0^{th}$ and $1^{st}$ primary focal points reasonably large. This is illustrated by FIG. 9A, which shows a graph of the function $\{I_m/(S-R)\}$ vs $(S-R)$. Curve 70 is defined by:

$$I_m = (4\pi^2) \cdot \sin^2\{(S-R)\pi/2\delta$$

The graph in FIG. 9A shows that, without any absorption (i.e., $(S-R) - 1$), the fraction of transmitted light arriving at the primary focal points (i.e., $0^{th}$ and $1^{th}$ order) is 0.405. This fraction can be maximized by using the value of $(S-R)$ that satisfies the equation:

$$(S-R)\pi = \tan[(S-R)\pi/2]$$

which yields $(S-R) = 0.742$. The fraction of transmitted light arriving at the primary focal point for this maximum is 0.461.

Figure 9B:
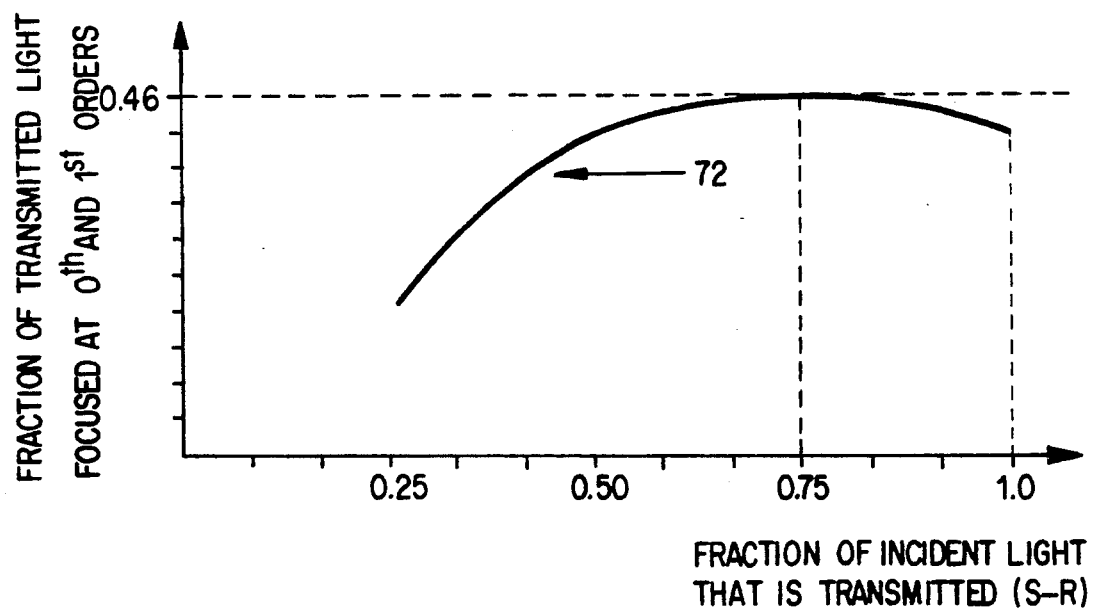
FIG. 9B shows a graph of the function $\{I_{0,1}/Tr\}$ vs Tr for a phase plate having a cosine surface profile and a binary transmission profile.

The graph in FIG. 9B shows the relationship between the fraction of transmitted light focused at the desired orders of diffraction vs the fraction of light incident on a lens comprising a cosine surface profile and a binary transmission profile. The graphs in FIGS. 9A and 9B show that the fraction of transmitted light arriving at the primary focal points is relatively insensitive to small changes in $(S-R)$. Thus, even when the fraction of the transmitted light is increased from 0.742 to 0.80, curves 70 and 72 show that 0.46 of the transmitted light is brought to each of the primary focal points. Further, because these equations depend upon $(S-R)$ and are not dependent or only weakly dependent upon the particular values of S and R themselves, some variation in the actual placement of the absorbing material can be accommodated.

Figure 10:
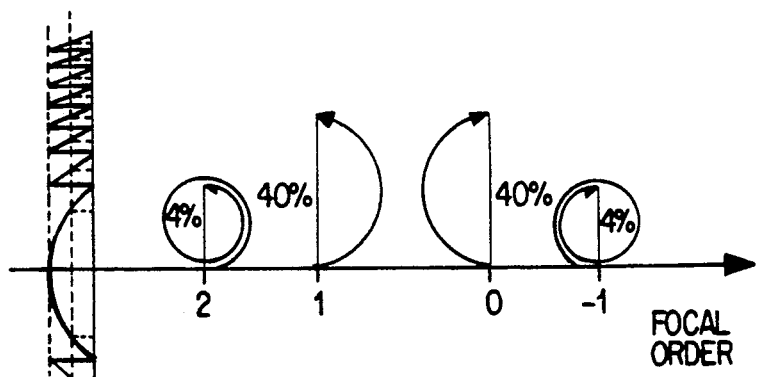
FIG. 10 is a vector representation of the light being focused to various focal points by a diffraction bifocal with a parabolic surface profile.
Figure 11:
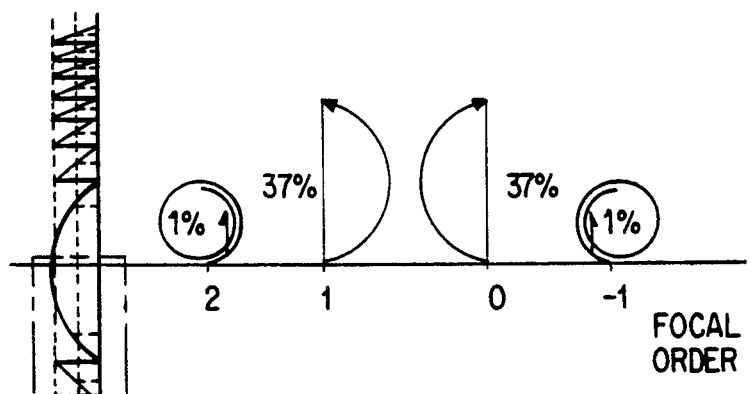
FIG. 11 is a vector representation of the light being focused to various focal points by a parabolic diffraction bifocal having a binary transmission profile.
Figure 12:
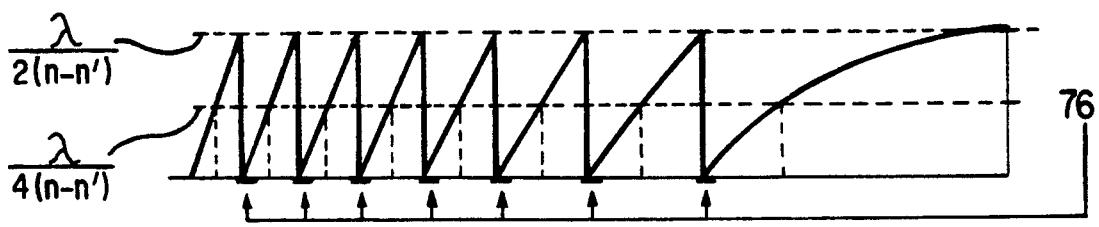
FIG. 12 is a cross-sectional view of the quarter section of the lens shown in FIG. 2A that illustrates a deposition of absorbing material to provide the binary transmission profile.

To better understand the physical principles by which the binary transmission profile design operates, reference is made to FIG. 10, 11 and 12. FIG. 10 shows a vector representation of the light being focused to each diffractive focal point by a bifocal phase zone plate with a parabolic surface profile. FIG. 11 shows a vector representation of the light being focused to each diffractive focal point by the same bifocal lens of FIG. 10, but with the addition of an absorbing material disposed to create a binary transmission profile. The dotted portions of the light vectors represent that portion of the light blocked by the absorbing material. FIG. 12 shows a magnification of the section 74 of the diffraction bifocal of FIG. 11, and details the absorbing material 76 that serves to block a portion of the transmitted light.

FIG. 11 makes it clear that, although blocking the incident light according to the binary transmission profile does not result in a significant reduction of light focused to the primary focal points, it does cause a significant reduction in the light focused at the spurious orders. Thus, by blocking the light that would normally pass through selected regions of the lens, light that otherwise would contribute disproportionately to the spurious orders is preferentially blocked out.

Note by comparing FIG. 11 with FIG. 10 that light focused to the $-1^{st}$ and $2^{nd}$ orders is reduced from 4 percent each of the transmitted light to 1 percent each of the transmitted light. Thus, there is a reduction of about 75 percent of light at those orders. The light intensity at the primary $0^{th}$ and $1^{th}$ orders, however, has only been reduced from about 40 percent to about 37 percent, for about a total 7 percent reduction at these orders.

Figure 13A:
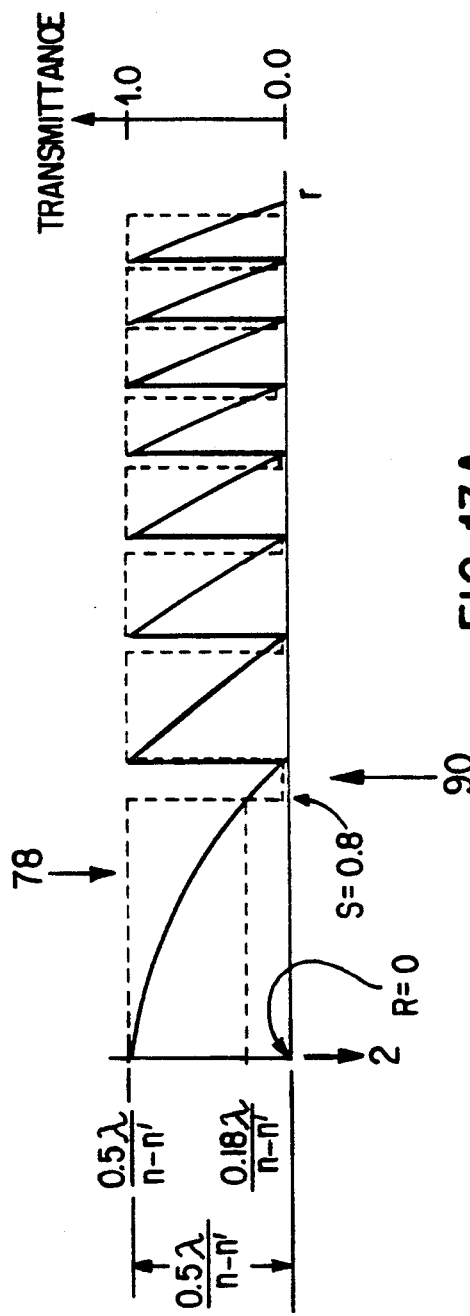
FIG. 13A is a cross-sectional view of a specific example of the second preferred embodiment in which the echelettes have a parabolic profile with half-wavelength maximum depth, and in which the absorbing material provides a binary transmission profile.
Figure 13B:
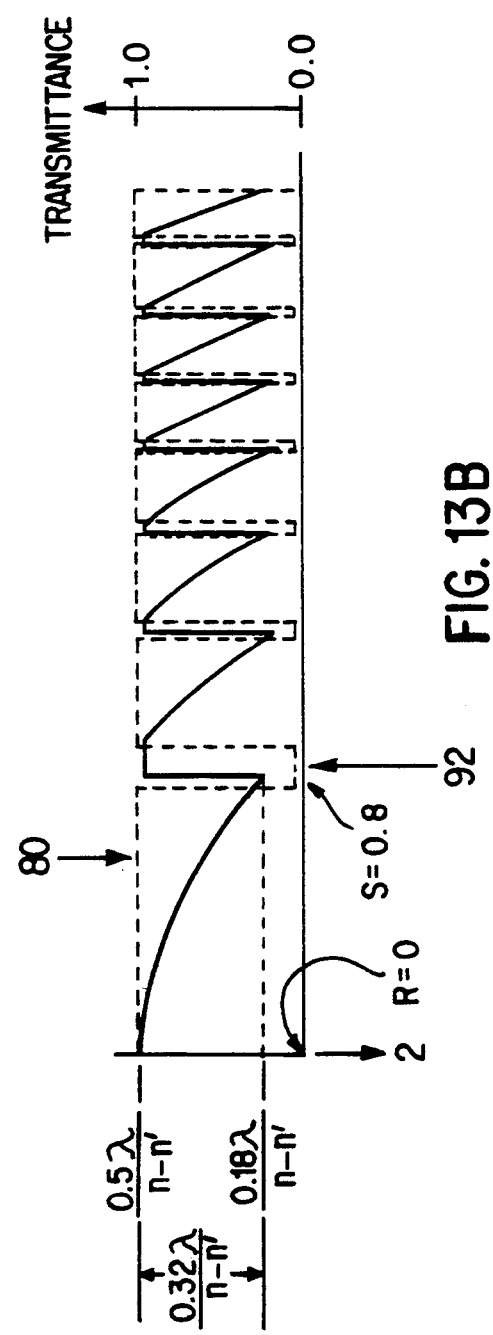
FIG. 13B is a cross-sectional view of another specific example of the second preferred embodiment similar to that of FIG. 13A in which the absorbing material provides another binary transmission profile.

Another example of a binary transmission profile in accordance with the second preferred embodiment is shown in FIG. 13A. In this example, the first and second parameters are selected so that $R = 0.0$ and $S = 0.8$. The transmission profile shown in FIG. 13A blocks all of the incident light arriving between the radial positions corresponding to $p = 0.0$ and $p = 0.8$. Hence, the phase shifting profile can be arbitrarily changed in this region without affecting the optics of the lens. For example, the lens shown in FIG. 13B is optically equivalent to the lens shown in FIG. 13A. The lens of FIG. 13B has the advantage that its echelettes are 36 percent shallower than the echelettes in the lens of FIG. 13A.

Having described the preferred embodiments of the invention, the preferred methods of the invention will now be described. In accordance with the invention, a method is provided for manufacturing a multifocal optical device for focusing light traveling parallel to an optical axis of the device. The method includes providing a multifocal phase zone plate including at least two annular zones disposed substantially concentrically about the optical axis and spaced from the optical axis in proportion to the square root of q, where q is an integer zone number. Examples of such multifocal phase zone plates have been described above with reference to FIGS. 2A, 4A, 5A and 6A.

The method of the invention further includes disposing an absorbing material on a portion of each of the annular zones for absorbing a portion of the light. The absorbing material disposing step may be carried out in a number of ways.

Figure 16:
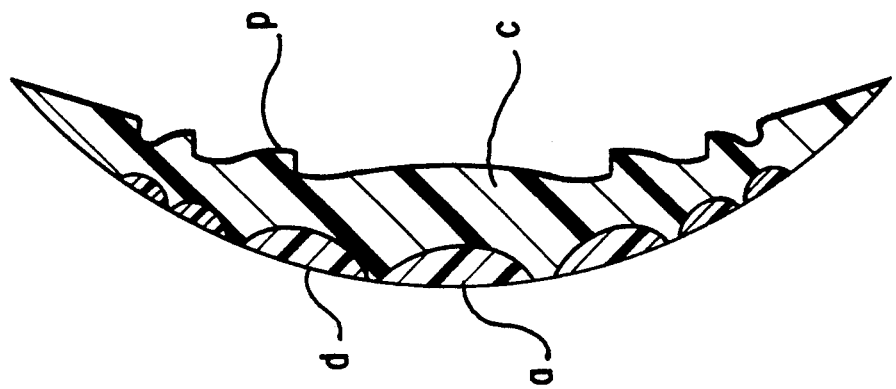
FIG. 16 shows a cross-sectional view of a specific example of the first preferred embodiment of the invention in which the echelettes have a cosine surface profile and the absorbing material provides a sinusoidal transmission profile.
Figure 15:
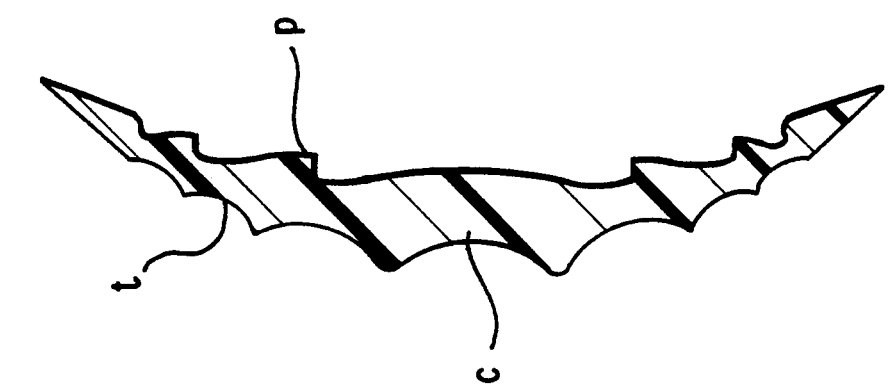
FIG. 15 shows a cross-sectional view of an intermediate lens formed with two surface relief profiles.
Figure 14:
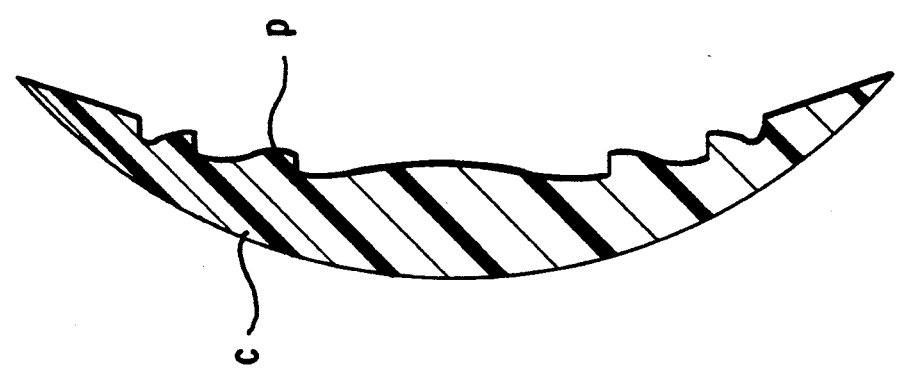
FIG. 14 shows a cross-sectional view of the lens shown in FIG. 1, wherein the echelettes of the lens have a cosine surface profile.

In accordance with the preferred method, absorbing material is placed in indentations in the anterior surface of the lens. For example, FIG. 14 is a cross-sectional view of a bifocal phase zone plate manufactured by a typical cast molding process, showing only a few of the zones of zone phase plate typically used in such lenses. In the particular illustration of FIG. 14, the blazing incorporates a cosine surface profile as defined above, and the depths of the echelettes have an optical path length of about $0.4\lambda$. The lens of FIG. 14 comprises an optically clear medium (c), typically an acrylate such as derived by the formation of a hydrogel from HEMA, as defined below, with a phase shifting surface relief profile (p) formed on the posterior surface of the lens. The same cast molding process can be used to manufacture an intermediate form of the lens having a surface relief profile (t) on the anterior surface, as shown in FIG. 15. In the intermediate lens form of FIG. 15, the surface relief profile (p) on the posterior surface is taken to be the phase shifting profile while the surface relief profile (t) on the anterior surface is designed to give a desired transmission profile. More specifically, the transmission profile can be produced by filling in the indentations of the surface relief profile (t) with a moderately weak light absorbing material (a). This will result in a lens in which the light absorbing material (a) is of varying thickness (d), as shown in FIG. 16. The intensity of light transmitted through absorbing material (a) is generally related to the thickness (d) of the material (a) according to the expression:

$$I(d) = \exp\{-\alpha d\}$$

where $\alpha$ is an absorption constant characteristic of material (a)

and the expression:
$$A^2(r) = I(d)$$

Hence, the surface relief profile (t) which must be configured with the absorbing material to yield the profile $A(r)$ may be designed according to the formula:

$$i\, d = (-2/\alpha)\ln\{A(r)\}$$

where
 d = depth of surface relief profile (t)
 r = distance in the radial dimension from the optical axis It should be noted that if the refractive indices of the optically clear medium (c) and the light absorbing material (a) are different, the phase shifting profile $\phi$ must be adjusted accordingly.

In accordance with the preferred method, a lens with the transmission profiles illustrated in FIGS. 7 and 8 can be manufactured using a moderately weak light absorbing dye as the absorbing material to fill the front profile (t) of the intermediate lens form shown in FIG. 15. The anterior surface can then be lathed or polished to remove a desired amount of lens material to produce the final embodiment, as shown in FIG. 16.

Figure 18:
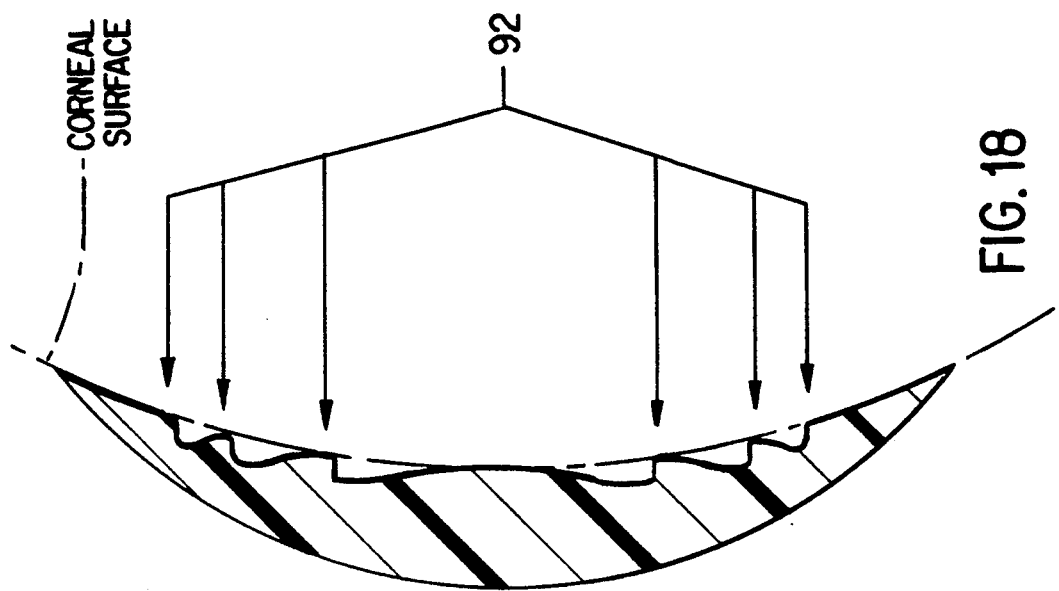
FIG. 18 shows a cross-sectional view of a lens that incorporates an absorbing material such as shown in FIG. 13B.
Figure 17:
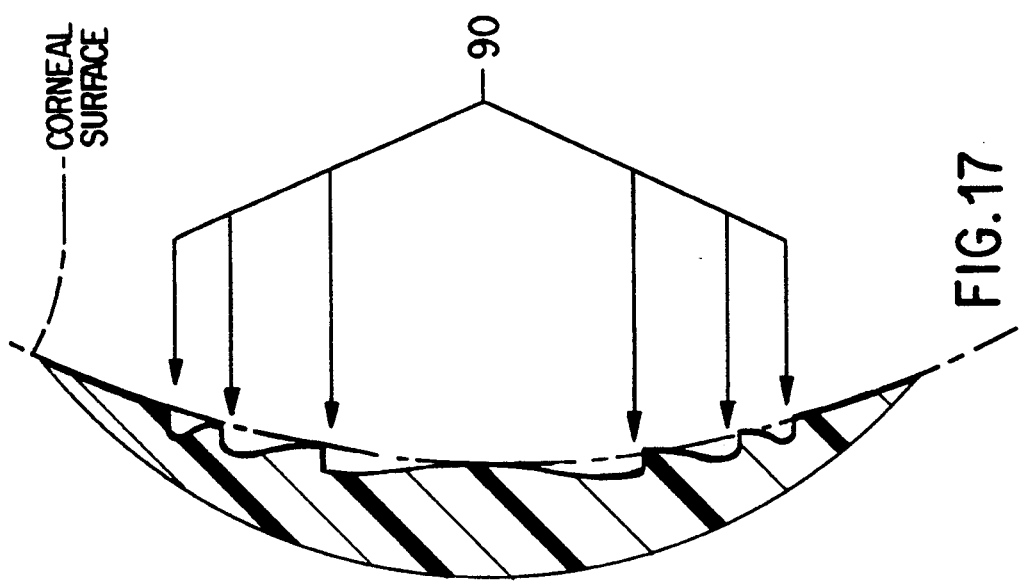
FIG. 17 is a cross-sectional view of a lens that incorporates an absorbing material such as shown in FIG. 13A.

The absorbing material can also be applied to the posterior surface of the lens. For example, FIG. 17 shows a cross-sectional view of a multifocal ophthalmic lens in which an absorbing material 90 has been selectively placed on the posterior surface of the lens to obtain a lens comprising the binary transmission profile illustrated in FIG. 13A and a cosine surface profiled phase zone plate. Similarly, FIG. 18 shows a cross-sectional view of a multifocal ophthalmic lens in which an absorbing material 92 has been selectively placed on the posterior surface of the lens to obtain a lens comprising the binary transmission profile illustrated in FIG. 13B and a cosine surface profiled phase zone plate. The lens of FIG. 18 may be more useful as a contact lens than the lens of FIG. 17 because it is better able to match a corneal shape and allow the use of echelettes having a reduced depth, both being factors that enhance the comfort of the lens to the wearer. FIGS. 17 and 18 illustrate that the binary transmission profile allows for a considerable amount of latitude in lens design.

The absorbing material can be painted on the lens, transfer printed on the lens, or molded into the body of the lens during the molding of the lens. Techniques used to decorate the iris portion of the lens to make cosmetic lenses may be employed in the practice of this invention to incorporate the absorbing material into or onto the phase zone plate.

There are disadvantages in processes which involve printing directly to the lens surface such as applying an absorbing material to the surface of the lens so that the absorbing material projects outward from the surface. For example, this type of printing directly onto the lens increases the thickness of the lens, thereby reducing oxygen transmissibility.

Although the multifocal phase zone plate may be provided on either or both of the anterior and posterior surfaces of the lens body, the phase zone plate preferably is provided in the posterior surface of the lens that is in contact with the cornea. In addition, it is desirable that the absorbing material be provided on the lens in a manner that avoids introducing a surface which the wearer will find uncomfortable. If the lens is first formed with the phase zone plate intact and then the absorbing material is coated onto the phase zone plate using coating procedures such as transfer printing, the printed absorbing material can generate a raised relief surface on the lens. This can cause the lens to ride on the cornea on top of the raised pattern of the absorbing material which may cause the lens to be uncomfortable to wear and could even adversely affect vision through the lens. Moreover, printing on the surface of the lens can introduce smudging of the absorbing material, which would interfere with the optical quality of the lens. The problem of effectively coating the absorbing material onto the phase zone plate of the lens can be somewhat mitigated by coating the absorbing material onto the anterior surface of the lens and placing the phase zone plate in the posterior surface of the lens. This can be expected to lessen the discomfort relative to coating the absorbing material directly upon a phase zone plate placed within the posterior surface of the lens. In addition, as described above with regard to FIGS. 13A and 13B, the absorbing material may be disposed on the phase zone plate so that the geometric surface profile need not be as deep as a conventional bifocal phase zone plate. Consequently, the resulting surface coating of the absorbing material on the lens need not be as elevated above the lens surface as one would have presumed.

Another preferred method in accordance with the invention, one in which a mold is used to apply the absorbing material, will now be described. This form of the method is similar to the previously described preferred method, but differs in the absorbing material disposing step. More specifically, in the absorbing material disposing step of this method, the absorbing material is applied to the body of the lens by first depositing the absorbing material as a coating onto the surface of the mold in which the lens is to be produced. The deposition onto the mold surface of the absorbing material can be effected by conventional transfer printing of an ink containing the light absorbing material, either on the mold surface incorporating the phase zone plate profile or on the opposite mold surface to the mold surface incorporating the phase zone plate profile.

Figure 19:
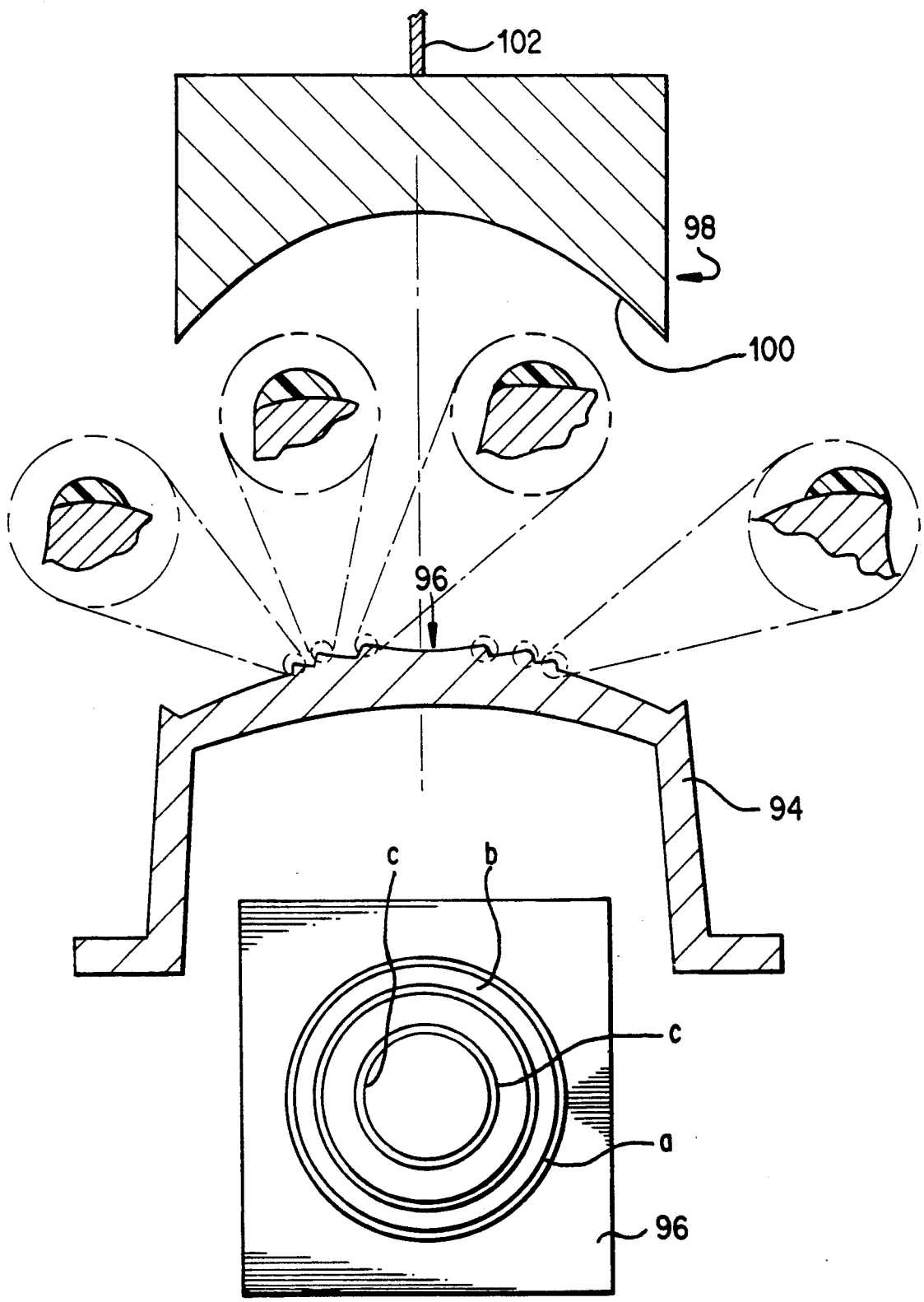
FIG. 19 shows cross-sectional views of a male molding form and a female molding form used in a casting process in accordance with a preferred method of the invention.

In accordance with this preferred method, the absorbing material disposing step includes providing a mold having mating first and second parts. For example, FIG. 19 shows a cross-sectional view of a cast mold comprising mold closure element 98 containing smooth mold surface 100 representing a concave surface in element 98. Element 98 is positioned over base element 94, which comprises a convex surface 96. Convex surface 96 is the mirror image of the phase zone plate of the desired bifocal contact lens. The plan view of surface 96 is shown in the inset portion of the figure positioned below element 94. As shown in FIG. 19, each mold contains components a, b and c comprising the absorbing material used to create the transmission profile. Components a, b and c are not part of the mold surface 96 but are added to the mold surface 98 by a coating step. Because the phase zone plate of FIG. 19 is intended only to illustrate the principles of the process of the manufacture of the lenses for this preferred method, for convenience purposes, it only shows a few of the annular zones that one would employ in a typical lens made according to this method. In a more accurate portrayal of such a lens, there would be more annular zones in the phase zone plate and, therefore, more components a, b and c.

The nature of the absorbing material will dictate the materials used in its formation. For example, if the absorbing material is intended to have a relatively low blockage of light, then it may be made of a material that is relatively transparent and only contains an absorbent medium to effect a low level of light absorption. If it is desired to increase the level of blockage of light, then the absorbing material may be made of a material that contains enough absorbent medium to effect the desired level of light absorption. If one seeks to achieve a binary transmission profile on the phase zone plate, then it is desirable that the absorbing material be made of a material that renders the absorbing portions of the lens opaque.

The absorbing material used to create the transmission profile preferably comprises a liquid that includes a vehicle and a colorant. A colorant is any material that introduces a color in all or any portion of the visible spectrum. The vehicle can include a thermoplastic coating material or a curable coating material provided in liquid form. The coating materials preferably are liquid or are rendered liquid by the use of a solvent or diluent. The vehicle may comprise a multiphase composition such as a dispersion of the coating material in a diluent such as water. The colorant may be any of the conventional reactive and nonreactive dyes in the art or taught by the art for use in tinting contact lenses and the various pigmentary materials used in the art and coating industry.

It is desirable that the coating material have the capacity of withstanding autoclaving conditions employed in the lens art for the sterilization of the lens. For example, it would be desirable that the coating material, when part of the final contact lens, be able to effectively pass 150° C. autoclaving for about 5 to about 30 minutes. The colorant blended with the resin and in the final contact lens is desirably resistant to removal by lachrymal liquids or cleansing and bactericidal agents used to treat the lens in typical usage.

The vehicle of the colored liquid can be a thermoplastic or curable. It is desirable to make the liquid by blending a colorant of choice into a plastic or resin while provided in liquid form in the usual fashion known to the art. The plastic may be the usual thermoplastic materials that are used in coatings, such as waterborne latex coating systems based on acrylic resins, vinyl acetate resins, copolymeric resins containing acrylics, or vinyl acetate.

The method preferably includes affixing the absorbing material to the mold. Preferably, the coating material for forming the absorbing material is supplied to the phase zone plate surface of the mold before the lens forming material is added to the mold and the shaping of the lens takes place. In cast molding of a small lens such as a contact lens or an intraocular lens, the mold is provided with surfaces which replicate the anterior and posterior of the lens, including the optic zone.

The absorbing material can be placed on the mold by a variety of printing procedures including, for example, painting onto the mold with a brush. In the commercial manufacture of the lens, it is more desirable to print the absorbing material onto the mold surface using well known and understood automated techniques, such as by transfer printing from an etched plate of the pattern using a soft rubber pad. The etched pattern may be filled and leveled out with the absorbing material and a soft silicone rubber transfer stamp can then be impressed upon the pattern to capture the pattern on the stamp surface. The stamp is then brought to the mold and depressed in the correct place to transfer the pattern to the mold, thus creating absorbing material components a, b and c shown in FIG. 19 in exaggerated size for the purpose of illustration. The absorbing material may then be subject to partial polymerization, or full cure if the vehicle is not thermoplastic.

Alternatively, the absorbing material may be created on the mold with an air brush, or by ink jetting, and the like methods of coating the absorbing material coating onto the mold.

In still another method, a liquid coating material may be injected from a die having a face that conforms to the shape of the mold surface to which the coating is to be supplied and possessing holes in the face configuring to the optic zone section on the mold surface that is to be coated. The holes replicate the pattern of the absorbing material to be coated onto the mold. The die can be dropped to the surface of the mold similar to a date stamper, and the pressure on the die face can be used to force the coating material out of the die and onto the mold.

Figure 20:
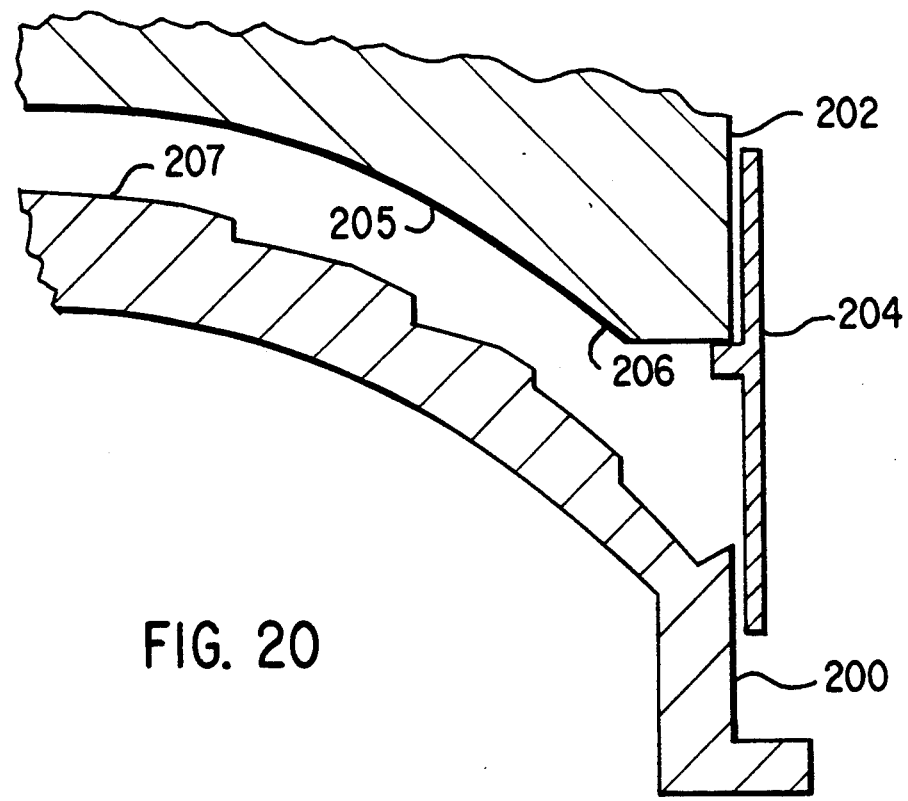
FIG. 20 shows a partial cut away cross sectional view of an apparatus useful in inking the male half of a mold in accordance with a preferred method of the invention.
Figure 21:
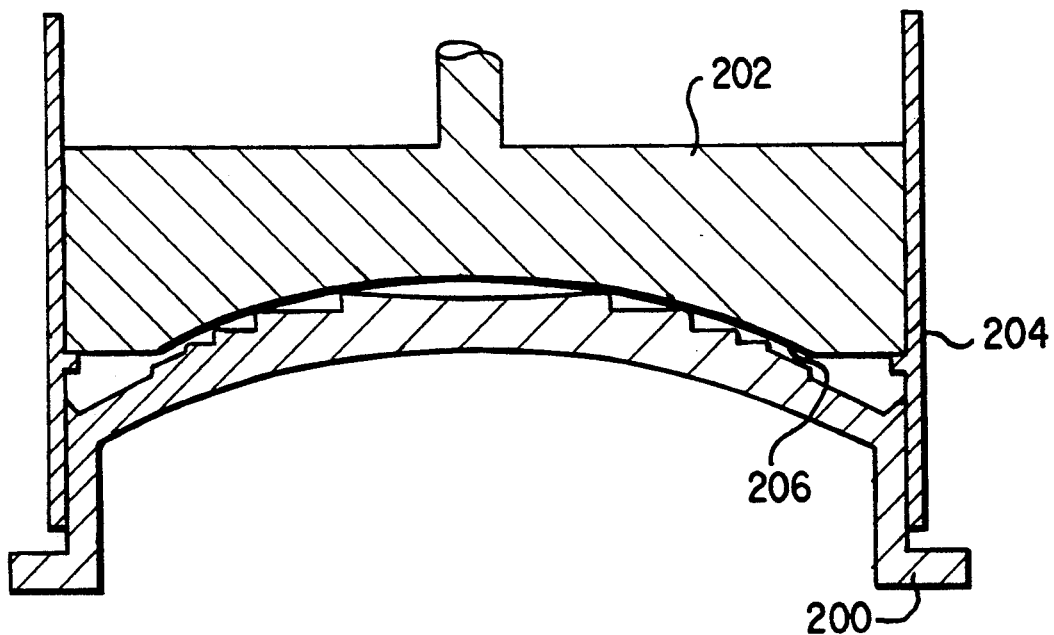
FIG. 21 is full cross-sectional view of the apparatus of FIG. 20.

FIGS. 20 and 21 show cross-sectional views of an apparatus for "inking" the male half of a mold by still another method useful in making a lens in accordance with the preferred method. As shown in FIG. 20, a male half 200 of a mold is disposed in the inside bore of a guide 204 in spaced relation to an inking pad 202. Inking pad 202 has a substantially spherical surface 205 opposite top surface 207 of male half 200. Top surface 207 has the phase zone plate disposed on it. A layer of absorbing material 206 is disposed on spherical surface 205. As shown in FIG. 21, as male half 200 is moved along the inner bore of guide 204, it is brought into intimate physical contact with ink pad 202 through absorbing material 206. Thus, an amount of absorbing material is transferred to the raised portions of the phase zone plate formed in male half 200 to create the desired absorbency profile.

The preferred method further includes the subsequent step whereby the lens-forming material is fed to the mold so that the mold is appropriately filled with the lens-forming material. The lens upon which or within which the absorbing material is disposed may be made by conventional processes known in the art. For example, anhydrous versions of the material of a soft contact lens may be ground to provide the lens structures. Lenses also may be cast from molds replicating the lens structures. The lenses may be made of glass or conventional plastics used for making contact lenses.

As pointed out above, prior to the feeding of the lens forming material to the mold, the mold parts are each treated to form a pattern on the mold surface in register to cause the formation of the absorbing material according to the transmission profile in the optic zone of the lens while the major portion of the optic zone is left transparent. The dimension of the optic zone accommodates dilation of the eye.

This preferred method further includes mating the first and second mold parts to contact the absorbing material to the multifocal phase zone plate. When a lens is molded through the use of male half 200, having absorbing material 206 transferred onto the mold as discussed above, and a suitable female half, a lens with the profile, for example, as illustrated in FIG. 13A with a cross-sectional view as shown in FIG. 17, can be formed. Or, after mold surface 96 is coated, as shown in FIG. 19, element 98 is lowered via rod 102 into contact with element 94 as shown in FIG. 22. The edges of concave surface 100 of element 98 are brought into a sealing relationship with the convex surface 96, and the open interior of the mold formed by elements 94 and 98 is filled by a lens-forming mixture 104, as described above, through ports (not shown). Again, surface 96 still contains the colored absorbing material also shown in FIG. 22.

Figure 23:
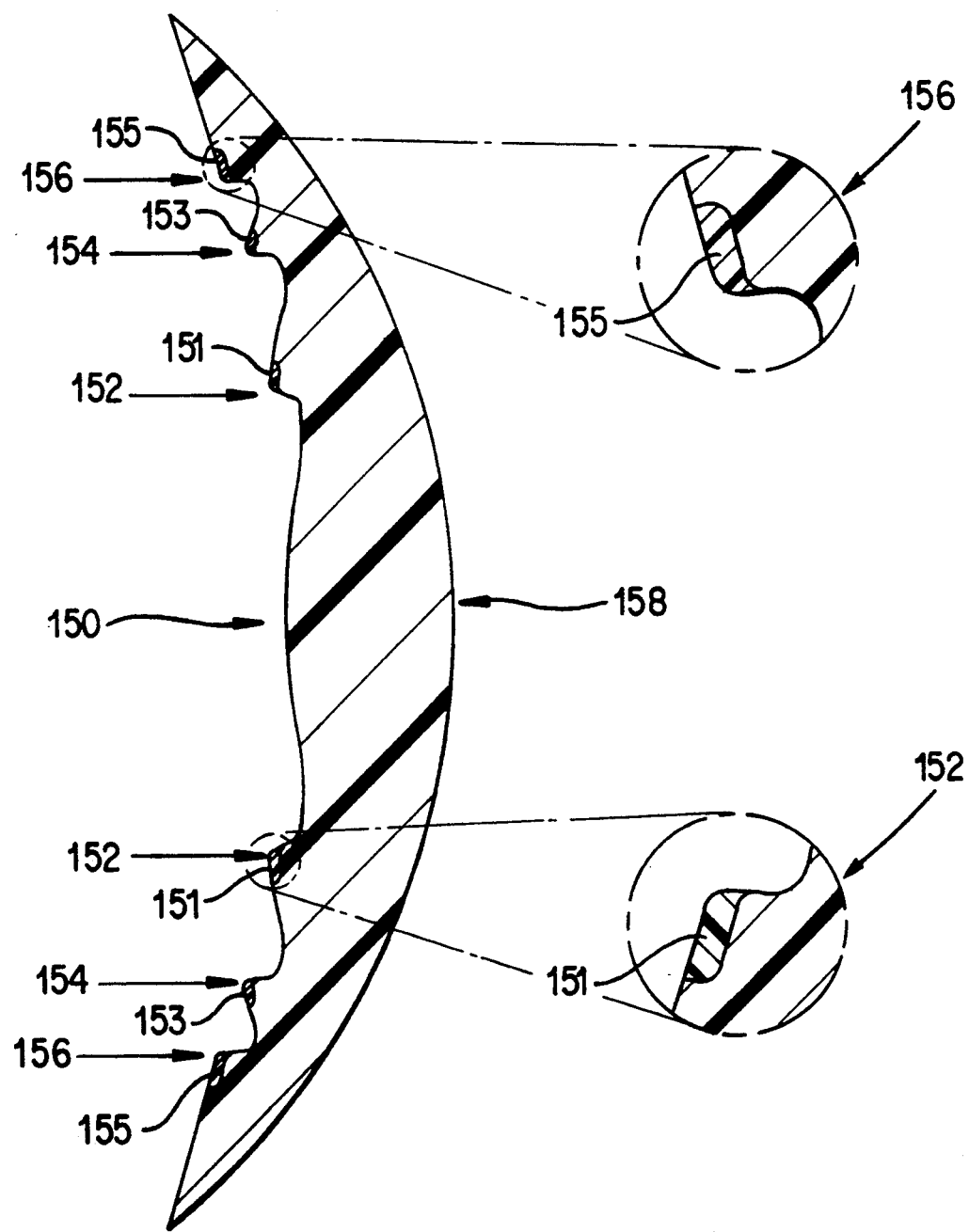
FIG. 23 shows a cross-sectional view of a lens with a cosine surface profile and a binary transmission profile produced by the apparatus shown in FIGS. 19 and 22.

On polymerization of the lens-forming mixture in the mold, the pattern is bonded to the resultant lens and becomes a part of its structure without creating a raised component on the surface of the lens as would occur if the pattern were coated on an already formed lens. After the polymerization is completed, the mold is opened and the lens is removed. Heating of the lens-forming mixture in the mold to cause polymerization and the formation of the completed lens may be effected by placing the mold in a heated zone, or by inclusion of heating elements in the mold. An illustrative lens produced according to the preferred method illustrated by FIGS. 19 and 22 is shown in FIG. 23. The posterior surface 150 of the lens of FIG. 23 contains echelette steps 152 and 154 and 156, each forming a riser to a full-period zone. The anterior surface 158 is smooth and contains no diffraction elements. Each of the steps contains absorbing material 151, 153, 155, formed as shown in FIGS. 19 and 22, which blocks the transmission of light passing in the vicinity of the step risers, 152, 154 and 156. Although FIGS. 19, 22 and 23 illustrate diffraction lenses possessing the cosine surface profile, it should be understood that the method of the invention can be practiced with any phase zone plate profile, including, for example, a parabolic surface profile.

Figure 24A:
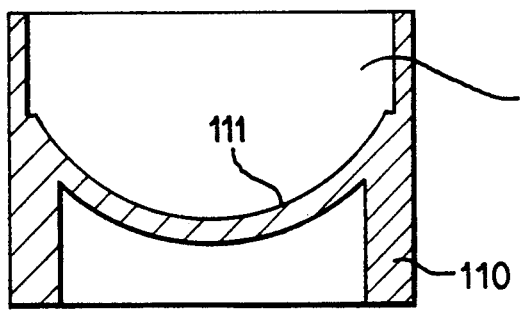
FIGS. 24A through 24E show cross-sectional views of a device useful in another casting procedure utilizing male and female molds in accordance with another preferred method according to the invention.
Figure 24B:
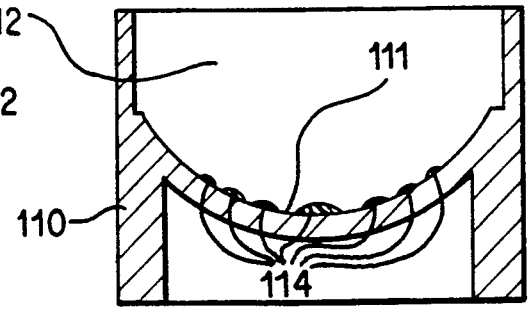
Figure 24C:
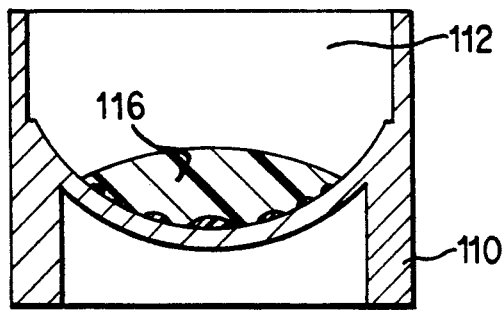
Figure 24D:
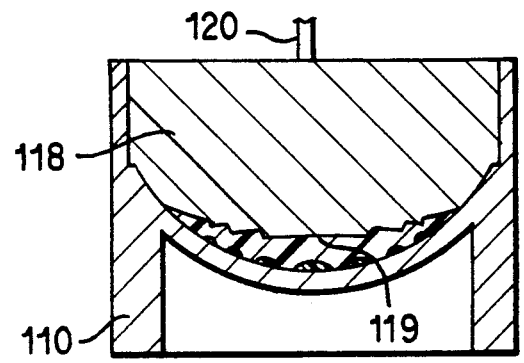
Figure 24E:
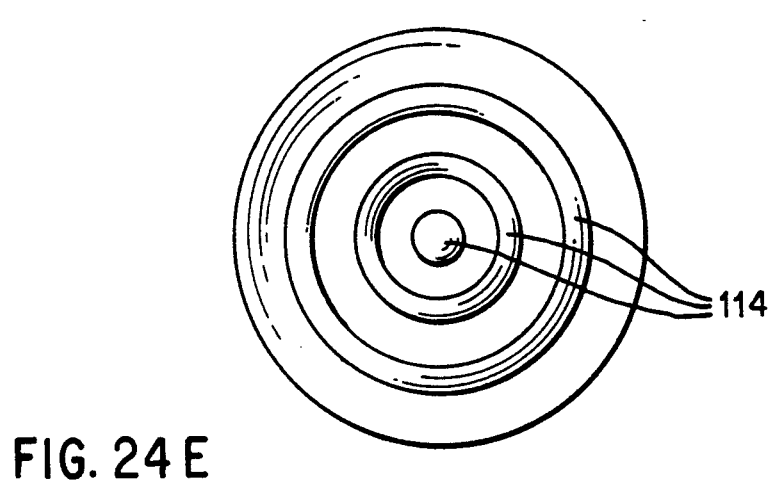

FIGS. 24A through 24E depict, in serial form, another preferred method of cast molding a lens in accordance with the invention. FIG. 24A shows a cross-sectional view of a cavity mold 110 having a cavity surface 111. Cavity surface 111 is a smooth surface upon which the anterior lens surface is to be formed. The mold is provided with an opening 112. FIG. 24B shows the next step in the process of molding the lens, in which the absorbing material is applied to the mold as rings and a dot 114 by transfer coating. FIG. 24C shows the addition of the lens-forming mixture 116 to mold interior 112 on top of ring and dot absorbing material 114. FIG. 24D shows the last stage of the process, in which ram 118 fed by rod 120 is inserted into opening 112 and compresses lens-forming mixture 116. The face 119 of ram 118 is the male replication of the posterior surface of the desired lens possessing the phase zone plate profile. FIG. 24E is an expanded view of dot and ring arrangement 114 of the absorbing material.

Figure 25:
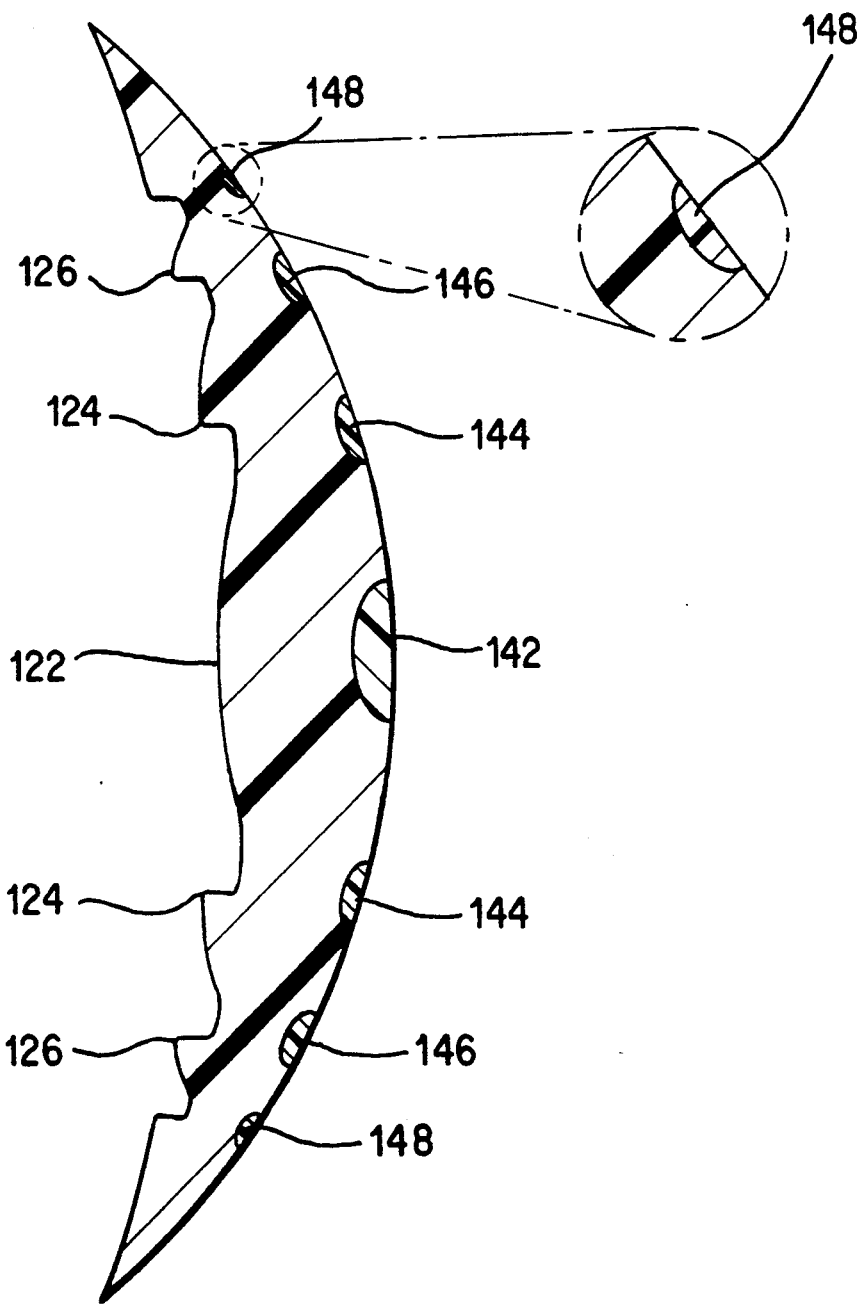
FIG. 25 shows a cross-sectional view of a lens in accordance with the present invention produced by the steps illustrated in FIGS. 24A through 24D.

FIG. 25 is a cross-sectional view of the lens produced according to the procedures of FIGS. 24A through 24D. The phase zone plate 122 on the posterior surface of the lens contains echelette steps 124 and 126. In this illustration, the surface profiles possess the cosine surface profile, but the profile may assume any useful shape, such as that of the parabolic surface profile discussed previously. The anterior surface of the lens contains dot and rings 142, 144 and 148. Because of the small size of the cross-section of ring 148, it is also shown in an expanded view.

Figure 26:
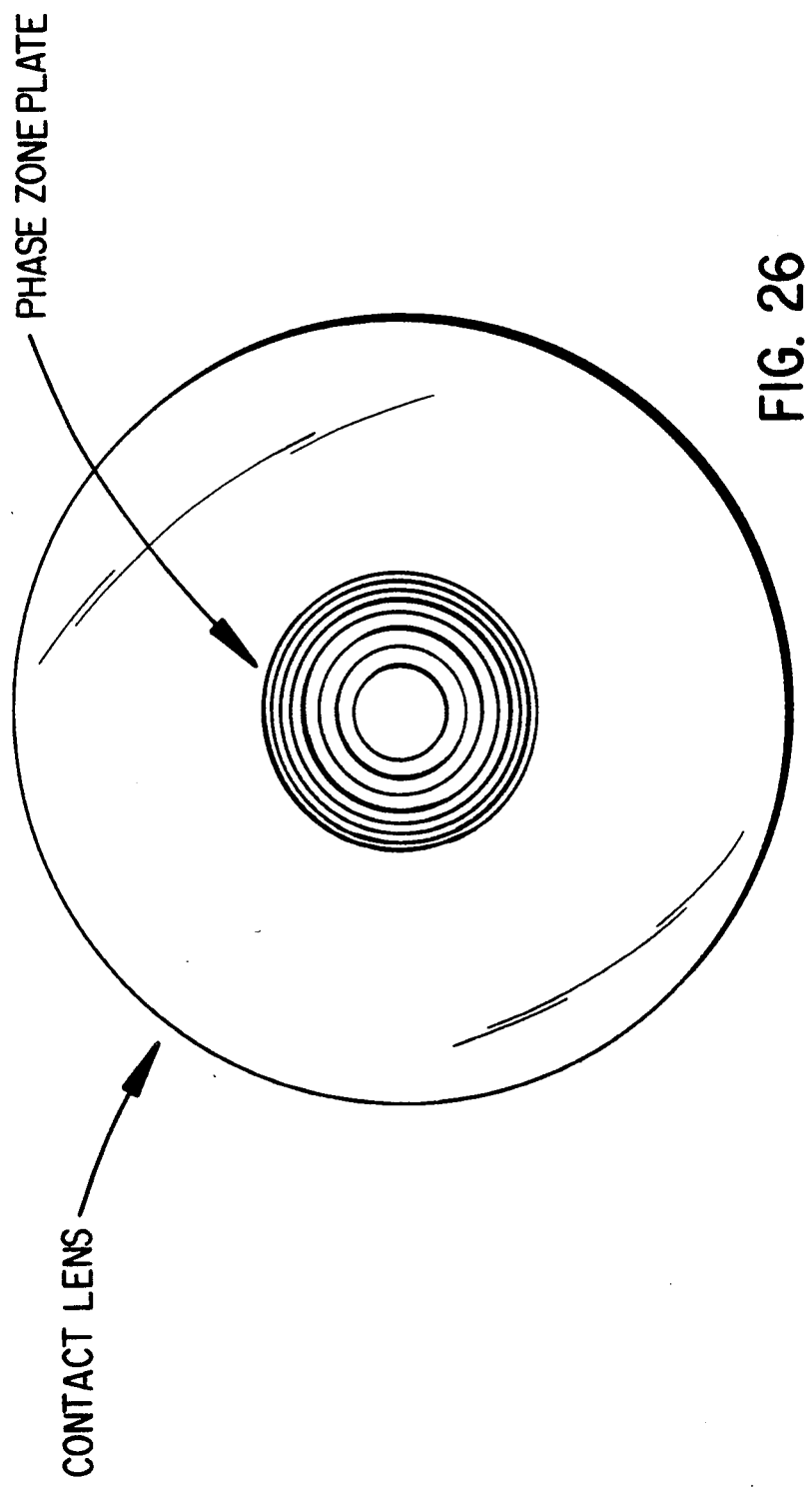
FIG. 26 shows a plan view of a contact lens in accordance with the invention showing an absorbing material in the phase zone plate located in the optic zone of the lens.

FIG. 26 is an expanded plan view of a contact lens or an IOL containing a phase zone plate as shown in FIG. 1. The lens of FIG. 26 depicts the pattern of the absorbing material as it would appear in a lens such as that of FIG. 23. FIG. 26 shows that a lens in accordance with the invention can have a distinctive decorative pattern independent of phase zone plate diffractive optics. This figure demonstrates that the pattern associated with the absorbing material can be used as a contrasting decoration that allows one to locate the lens against difficult backgrounds.

The absorbing means that one selects in the practice of the invention depends on the level of light absorption required for removing unwanted transmission of light to the undesired orders. The color of the absorbing material is variable and may range from black, white, blue, red, green, yellow, etc. Preferably, the absorbing material is black or gray. However, if one wishes to introduce chromatic distinctions into the lens or enhance the response of the eye to certain chromatic wavelengths, other colors may be employed as would be responsive to the requirements sought.

It will be apparent to those skilled in the art that various modifications and variations can be made in practicing the present invention without departing from the scope or spirit of the invention. For example, the invention is not restricted to the particular profiles or embodiments of absorbing means described. The invention may employ absorbing means on the anterior or posterior surface of a lens and the phase shifting profile may be on the same or opposite lens surface. Furthermore, either or both the transmission profile and/or the phase profile may be incorporated or enclosed within the body of the lens. Thus, it is intended that the present invention cover the modifications and variations of this invention, provided they come within the scope of the appended claims and their equivalents.

What is claimed is:

1. A multifocal optical device for focusing light traveling parallel to an optical axis of the device, the multifocal optical device comprising:

a multifocal phase zone plate including at least two annular zones disposed substantially concentrically about the optical axis and spaced in a radial dimension from the optical axis in proportion to the square root of q, where q is an integer zone number, the annular zones including blazed facets; and absorbing means disposed on a portion of selected ones of the annular zones for absorbing a portion of the light.

2. A multifocal optical device as recited in claim 1, wherein the absorbing means includes at least one of a pigment, a paint, a dye, an ink composition, and a polymeric composition.

3. A multifocal optical device as recited in claim 1, wherein:

the annular zones are positioned to direct the light to a $0^{th}$ order focal point, to a $1^{st}$ order focal point, and to higher order focal points on the optical axis, and predominately to the $0^{th}$ and $1^{st}$ order focal points; and the absorbing means is positioned to absorb portions of the light that would result in an increased light intensity being focused to the higher order focal points absent the absorbing means.

4. A multifocal optical device as recited in claim 1, wherein:

the annular zones are positioned to direct the light to a $0^{th}$ order focal point, to a 31 $1^{st}$ order focal point, and to higher order focal points on the optical axis, and predominately to the $0^{th}$ and $-1^{st}$ order focal points; and the absorbing means is positioned to absorb portions of the light that would result in an increased light intensity being focused to the higher order focal points absent the absorbing means.

5. A multifocal optical device as recited in claim 1, wherein the portion of each selected pair of adjacent annular zones upon which the absorbing means is disposed comprises less than all of the selected annular zone pair.

6. A multifocal optical device as recited in claim 1, wherein the absorbing means is disposed on the annular zones to absorb the light nonuniformly along the radial dimension.

7. A multifocal optical device as recited in claim 1, wherein the absorbing means is disposed on the annular zones to absorb the light in a repetitive pattern along the radial dimension of the lens.

8. A multifocal optical device for focusing light traveling parallel to an optical axis of the device, the multifocal optical device comprising:
   a multifocal phase zone plate including at least two annular zones disposed substantially concentrically about the optical axis and spaced in a radial dimension from the optical axis in proportion to the square root of q, where q is an integer zone number; and
   absorbing means disposed on a portion of selected ones of the annular zones for absorbing a portion of the light, the absorbing means being disposed on the selected annular zones to provide a sinusoidal transmission profile along the radial dimension.

9. A multifocal optical device for focusing light traveling parallel to an optical axis of the device, the multifocal optical device comprising:
   a multifocal phase zone plate including at least two annular zones disposed substantially concentrically about the optical axis and spaced in a radial dimension from the optical axis in proportion to the square root of q, where q is an integer zone number; and
   absorbing means disposed on a portion of selected ones of the annular zones for absorbing a portion of the light, the absorbing means being disposed on the annular zones to form a binary transmission profile in which a first portion of selected pairs of adjacent annular zones has a first non-zero transmittance value and a second portion of the selected pairs of adjacent annular zones different from the first portion has a second non-zero transmittance value different from the first non-zero transmittance value.

10. A multifocal optical device for focusing light traveling parallel to an optical axis of the device, the multifocal optical device comprising:
    a multifocal phase zone plate including at least two annular zones disposed substantially concentrically about the optical axis and spaced in a radial dimension from the optical axis in proportion to the square root of q, where q is an integer zone number; and
    absorbing means disposed on a portion of selected ones of the annular zones for absorbing a portion of the light, the absorbing means being disposed on annular zone pairs in a repetitive profile satisfying the relationship:

$A(p) = 1.0$ for $R < p < S$, with $0.0 < R < S < 1.0$.

and
$A(p) = 0.0$ for all other values of p
where
   a(p) is a transmission profile of the device as a function of p;
   R is a first selected parameter;
   S is a second selected parameter;
   p is $r^2/b^2$;
   r is a radial distance within a first and second one of the annular zones of the multifocal phase zone plate measured perpendicularly from the optical axis; and
   b is an outside radius of the second annular zone.

11. A multifocal optical device as recited in claim 10, wherein:
    the first selected parameter R has a value of about 0.0;
    the second selected parameter S has a value of about 0.8; and
    the absorbing means is disposed on about 20 percent of a surface area of the multifocal phase zone plate.

12. A multifocal optical device as recited in claim 10, wherein the device comprises an ophthalmic lens.

13. A multifocal optical device as recited in claim 12, wherein the ophthalmic lens comprises a contact lens.

14. A multifocal optical device as recited in claim 12, wherein the ophthalmic lens is an intraocular lens.

15. A method for manufacturing a multifocal optical device for focusing light traveling parallel to an optical axis of the device, the method comprising:
    providing a multifocal phase zone plate including at least two annular zones disposed substantially concentrically about the optical axis and spaced from the optical axis in proportion to the square root of q, wherein q is an integer zone number, the annular zones including blazed facets; and
    disposing an absorbing material on a portion of selected ones of the annular zones for absorbing a portion of the light.

16. A method as recited in claim 15, wherein the absorbing material disposing step includes:
    providing a mold having mating first and second parts;
    affixing the absorbing material to the mold;
    filling the mold with a lens forming material; and
    mating the first and second mold parts to contact the absorbing material to the multifocal phase zone plate.

* * * * *